(12) United States Patent
Hsueh et al.

(10) Patent No.: US 9,874,720 B2
(45) Date of Patent: Jan. 23, 2018

(54) IMAGING SYSTEM, IMAGE CAPTURING APPARATUS AND ELECTRONIC DEVICE

(71) Applicant: LARGAN PRECISION CO., LTD., Taichung (TW)

(72) Inventors: Chun-Che Hsueh, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 316 days.

(21) Appl. No.: 14/727,302

(22) Filed: Jun. 1, 2015

(65) Prior Publication Data

US 2016/0259147 A1 Sep. 8, 2016

(30) Foreign Application Priority Data

Mar. 2, 2015 (TW) .............................. 104106526 A

(51) Int. Cl.
| | | |
|---|---|---|
| *G02B 3/02* | (2006.01) | |
| *G02B 21/02* | (2006.01) | |
| *G02B 13/04* | (2006.01) | |
| *G02B 9/62* | (2006.01) | |
| *G02B 9/60* | (2006.01) | |
| *G02B 13/00* | (2006.01) | |

(52) U.S. Cl.
CPC .......... *G02B 13/0045* (2013.01); *G02B 9/60* (2013.01)

(58) Field of Classification Search
CPC ........ G02B 13/18; G02B 21/02; G02B 13/02; G02B 13/04; G02B 13/00; G02B 9/60
USPC ....... 359/714, 659, 746, 753, 757, 763, 764, 359/766
See application file for complete search history.

(56) References Cited

U.S. PATENT DOCUMENTS

| 8,325,430 B1 | 12/2012 | Tsai |
|---|---|---|
| 8,400,716 B2 | 3/2013 | Jeong |
| 8,508,859 B2 | 8/2013 | Tsai et al. |
| 2012/0140104 A1 | 6/2012 | Ozaki |
| 2013/0176469 A1 | 7/2013 | Sano et al. |
| 2013/0265651 A1 | 10/2013 | Ishizaka |
| 2014/0293452 A1 | 10/2014 | Kanda et al. |
| 2014/0293453 A1 | 10/2014 | Ogino et al. |
| 2014/0340765 A1 | 11/2014 | Tsai et al. |

(Continued)

FOREIGN PATENT DOCUMENTS

| JP | 2012-190037 A | 10/2012 |
|---|---|---|
| JP | 2014-089277 A | 5/2014 |

(Continued)

*Primary Examiner* — Dawayne A Pinkney
(74) *Attorney, Agent, or Firm* — McClure, Qualey & Rodack, LLP

(57) ABSTRACT

An imaging system includes, in order from an object side to an image side, a first lens element, a second lens element, a third lens element, a fourth lens element and a fifth lens element. The first lens element with positive refractive power has an object-side surface being convex in a paraxial region thereof. The second lens element with negative refractive power has an image-side surface being concave in a paraxial region thereof. The third lens element has refractive power. The fourth lens element with refractive power has an image-side surface being concave in a paraxial region thereof. The fifth lens element with refractive power has an object-side surface being convex in a paraxial region thereof and an image-side surface being concave in a paraxial region thereof.

22 Claims, 23 Drawing Sheets

(56) References Cited

U.S. PATENT DOCUMENTS

2015/0168695 A1 6/2015 Tsai et al.
2015/0370042 A1* 12/2015 Chen .................. G02B 13/0045
                                                                359/713

FOREIGN PATENT DOCUMENTS

| | | |
|---|---|---|
| JP | 2014-197105 A | 10/2014 |
| TW | 201415075 A | 4/2014 |
| TW | I465764 B | 12/2014 |
| WO | 2011-021271 A1 | 2/2011 |
| WO | 2013/063097 A1 | 5/2013 |
| WO | 2013/175782 A1 | 11/2013 |
| WO | 2013/175783 A1 | 11/2013 |
| WO | 2014/050476 A1 | 4/2014 |

* cited by examiner

IMAGING SYSTEM, IMAGE CAPTURING APPARATUS AND ELECTRONIC DEVICE

RELATED APPLICATIONS

This application claims priority to Taiwan Application Serial Number 104106526, filed Mar. 2, 2015, which is herein incorporated by reference.

BACKGROUND

Technical Field

The present disclosure relates to an imaging system and an image capturing apparatus. More particularly, the present disclosure relates to a compact imaging system and an image capturing apparatus which is applicable to electronic devices.

Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

Conventional optical systems employed in electronic devices mainly adopt four-element lens structures. The surface shapes of the lens elements of the optical systems with short total track length usually cause low relative illumination in the peripheral regions and poor molding of the lens elements. Hence, the conventional optical systems cannot satisfy these requirements of the compact optical systems.

Other conventional compact optical systems with five-element lens structure are also developed. However, the excessive thickness variation of the lens elements produces poor molding results, and the high refractive power leads to excessive sensitivity in manufacturing. Furthermore, the large variation of the incident angles also creates problems regarding surface reflections.

SUMMARY

According to one aspect of the present disclosure, an imaging system includes, in order from an object side to an image side, a first lens element, a second lens element, a third lens element, a fourth lens element and a fifth lens element. The first lens element with positive refractive power has an object-side surface being convex in a paraxial region thereof. The second lens element with negative refractive power has an image-side surface being concave in a paraxial region thereof. The third lens element has refractive power. The fourth lens element with refractive power has an image-side surface being concave in a paraxial region thereof, wherein an object-side surface and the image-side surface of the fourth lens element are aspheric, and the image-side surface of the fourth lens element includes at least one convex shape in an off-axis region thereof. The fifth lens element with refractive power has an object-side surface being convex in a paraxial region thereof and an image-side surface being concave in a paraxial region thereof, wherein the object-side surface and the image-side surface of the fifth lens element are aspheric, and the image-side surface of the fifth lens element includes at least one convex shape in an off-axis region thereof. The imaging system has a total of five lens elements with refractive power. There is an air gap between any two of the first lens element, the second lens element, the third lens element, the fourth lens element and the fifth lens element that are adjacent to each other. When a central thickness of the fourth lens element is CT4, an axial distance between the third lens element and the fourth lens element is T34, an axial distance between the fourth lens element and the fifth lens element is T45, a focal length of the imaging system is f, a curvature radius of an object-side surface of the third lens element is R5, a curvature radius of an image-side surface of the third lens element is R6, an Abbe number of the second lens element is V2, an Abbe number of the third lens element is V3, and an Abbe number of the fourth lens element is V4, the following conditions are satisfied:

$CT4/T34<1.20;$ $CT4/T45<1.60;$ $|f/R5|+|f/R6|<1.10;$ and $1.75<(V2+V4)/V3.$

According to another aspect of the present disclosure, an image capturing apparatus includes the imaging system according to the aforementioned aspect and an image sensor, wherein the image sensor is disposed on an image surface of the imaging system.

According to still another aspect of the present disclosure, an electronic device includes the image capturing apparatus according to the foregoing aspect.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
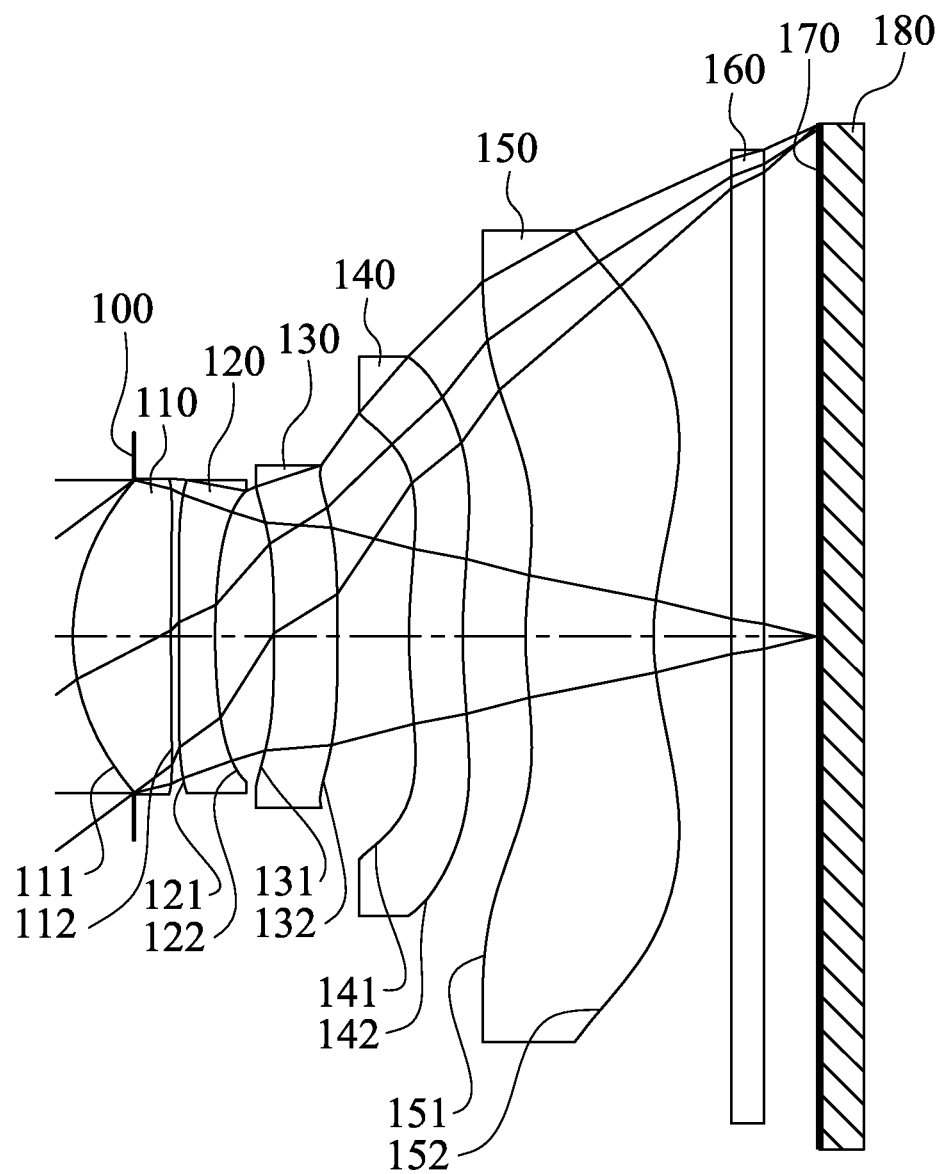
FIG. 1 is a schematic view of an image capturing apparatus according to to the 1st embodiment of the present disclosure.

An imaging system includes, in order from an object side to an image side, a first lens element, a second lens element, a third lens element, a fourth lens element and a fifth lens element. The imaging system has a total of five lens elements with refractive power.

According to the imaging system of the present disclosure, there is an air gap between any two of the first lens element, the second lens element, the third lens element, the fourth lens element and the fifth lens element that are adjacent to each other, that is, each of the first through fifth lens elements of the imaging system is a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality of the imaging system. Therefore, there is an air gap between any two of the first lens element, the second lens element, the third lens element, the fourth lens element and the fifth lens element that are adjacent to each other in the present disclosure for resolving the problem generated by the cemented lens elements.

The first lens element with positive refractive power has an object-side surface being convex in a paraxial region thereof, and can have an image-side surface being concave in a paraxial region thereof. Therefore, it is favorable for reducing the total track length of the imaging system by properly adjusting the positive refractive power of the first lens element.

The second lens element with negative refractive power has an image-side surface being concave in a paraxial region thereof. Therefore, it is favorable for effectively correcting the aberration of the imaging system.

The third lens element can have positive refractive power. Therefore, it is favorable for reducing the sensitivity of refractive power distribution in the imaging system.

The fourth lens element can have an object-side surface being convex in a paraxial region thereof, and has an image-side surface being concave in a paraxial region thereof, wherein the image-side surface of the fourth lens element includes at least one convex shape in an off-axis region thereof. Therefore, it is favorable for balancing the thickness arrangement between the paraxial region and the off-axis region of the fourth lens element so as to improve upon the poor molding results from excessive lens thickness variation.

The fifth lens element has an object-side surface being convex in a paraxial region thereof and an image-side surface being concave in a paraxial region thereof, wherein the image-side surface of the fifth lens element includes at least one convex shape in an off-axis region thereof. Therefore, it is favorable for balancing the thickness arrangement between the paraxial region and the off-axis region of the fifth lens element so as to improve upon the poor molding results from excessive lens thickness variation.

When a central thickness of the fourth lens element is CT4, and an axial distance between the third lens element and the fourth lens element is T34, the following condition is satisfied: CT4/T34<1.20. Therefore, it is favorable for arranging the third lens element and the fourth lens element so as to reduce the collision probability among the lens elements during assembling. Preferably, the following condition is satisfied: CT4/T34<1.0.

When the central thickness of the fourth lens element is CT4, and an axial distance between the fourth lens element and the fifth lens element is T45, the following condition is satisfied: CT4/T45<1.60. Therefore, it is favorable for arranging the fourth lens element and the fifth lens element so as to reduce the collision probability among the lens elements during assembling. Preferably, the following condition is satisfied: CT4/T45<1.48. More preferably, the following condition is satisfied: CT4/T45<1.25.

When a focal length of the imaging system is f, a curvature radius of an object-side surface of the third lens element is R5, and a curvature radius of an image-side surface of the third lens element is R6, the following condition is satisfied: |f/R5|+|f/R6|<1.10. Therefore, it is favorable for ensuring the third lens element with lesser refractive power in a paraxial region thereof so as to solve the problems of the image center excessively corrected. Preferably, the following condition is satisfied: |f/R5|+|f/R6|<0.75.

When an Abbe number of the second lens element is V2, an Abbe number of the third lens element is V3, and an Abbe number of the fourth lens element is V4, the following condition is satisfied: 1.75<(V2+V4)/V3. Therefore, it is favorable for balancing the correction in chromatic aberration and the high-order aberration.

When the Abbe number of the third lens element is V3, the following condition is satisfied: V3<30. Therefore, it is favorable for correcting the chromatic aberration of the imaging system.

When a curvature radius of the object-side surface of the fourth lens element is R7, and the focal length of the imaging system is f, the following condition is satisfied: |R7/f|<3.0. Therefore, it is favorable for correcting the aberration of the imaging system and improving the image quality. Preferably, the following condition is satisfied: |R7/f|<2.3.

When an f-number of the imaging system is Fno, the following condition is satisfied: 1.6<Fno<2.4. Therefore, it is favorable for obtaining a large aperture so as to capture clear image under insufficient light conditions.

When an axial distance between the object-side surface of the first lens element and an image surface is TL, the following condition is satisfied: TL<6 mm. Therefore, it is favorable for reducing the total track length of the imaging system so as to maintain the compact size thereof.

When half of a maximal field of view of the imaging system is HFOV, the following condition is satisfied: 35 degrees<HFOV. Therefore, it is favorable for obtaining a proper field of view and a greater imaging scene.

When the focal length of the imaging system is f, a focal length of the third lens element is f3, a focal length of the fourth lens element is f4, and a focal length of the fifth lens element is f5, the following condition is satisfied: |f/f3|+|f/f4|+|f/f5|<0.60. Therefore, it is favorable for reducing the sensitivity of refractive power distribution so as to prevent the problems of surface reflections from the excessive change of the incident angles.

When a focal length of the first lens element is f1, a focal length of the second lens element is f2, the focal length of the third lens element is f3, the focal length of the fourth lens element is f4, and the focal length of the fifth lens element is f5, the following conditions are satisfied: |f3|>|f1|; |f3|>|f2|; |f3|>|f4|, and |f3|>|f5|. Therefore, it is favorable for balancing the refractive power distribution of the imaging system so as to reduce the sensitivity of refractive power distribution.

When the curvature radius of the object-side surface of the fourth lens element is R7, a curvature radius of the image-side surface of the fourth lens element is R8, a curvature radius of the object-side surface of the fifth lens element is R9, a curvature radius of the image-side surface of the fifth lens element is R10, and the focal length of the imaging system is f, the following condition is satisfied: (|R7|+|R8|+|R9|+|R10|)/f<3.5. Therefore, it is favorable for properly arranging the surface shapes of the fourth lens element and the fifth lens element so as to solve the problems of poor molding.

When an axial distance between the first lens element and the second lens element is T12, an axial distance between the second lens element and the third lens element is T23, the axial distance between the third lens element and the fourth lens element is T34, the axial distance between the fourth lens element and the fifth lens element is T45, and a sum of axial distances between any two of the first lens element, the second lens element, the third lens element, the fourth lens element and the fifth lens element that are adjacent to each other is ΣAT (ΣAT=T12+T23+T34+T45), the following condition is satisfied: 0.60<(T34+T45)/ΣAT<0.80. Therefore, it is favorable for assembling the lens elements so as to increase the manufacturing yield rate.

When the Abbe number of the second lens element is V2, the Abbe number of the third lens element is V3, and the Abbe number of the fourth lens element is V4, the following condition is satisfied: V2+V3+V4<90. Therefore, it is favorable for correcting the chromatic aberration of the imaging system.

When a central thickness of the first lens element is CT1, a central thickness of the second lens element is CT2, a central thickness of the third lens element is CT3, the central thickness of the fourth lens element is CT4, and a central thickness of the fifth lens element is CT5, CT5 is larger than CT1, CT2, CT3, and CT4. Therefore, it is favorable for the moldability and the homogeneity of lens elements so as to increase the manufacturing yield rate.

When the central thickness of the second lens element is CT2, the central thickness of the third lens element is CT3, the central thickness of the fourth lens element is CT4, and the central thickness of the fifth lens element is CT5, the following condition is satisfied: (CT2+CT3+CT4)/CT5<1.25. Therefore, it is favorable for the moldability and the homogeneity of lens elements.

When the curvature radius of the image-side surface of the fourth lens element is R8, and the curvature radius of the object-side surface of the fifth lens element is R9, the following condition is satisfied: 1.20<R8/R9. Therefore, it is favorable for effectively correcting the aberration.

According to the imaging system of the present disclosure, the lens elements thereof can be made of plastic or glass material. When the lens elements are made of plastic material, the manufacturing costs can be effectively reduced. When the lens elements are made of glass material, the arrangement of the refractive power of the imaging system may be more flexible to design. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the imaging system can also be reduced.

According to the imaging system of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Furthermore, when the lens element has positive refractive power or negative refractive power, it indicates that the lens element has refractive power in the paraxial region thereof. When the lens element has a focal length, it indicates that the lens element has a focal length in the paraxial region thereof.

According to the imaging system of the present disclosure, the image surface, depending on the corresponding image sensor, can be a planar surface or a curved surface with any curvature. When the image surface is a curved surface, it is particularly indicates a concave surface toward the object side.

According to the imaging system of the present disclosure, an aperture stop can be configured as a front stop or a middle stop. A front stop disposed between an imaged object and the first lens element can provide a longer distance between an exit pupil of the imaging system and the image surface and thereby improves the image-sensing efficiency of an image sensor. A middle stop disposed between the first lens element and the image surface is favorable for enlarging the field of view of the imaging system and thereby provides a wider field of view for the same.

According to the imaging system of the present disclosure, the imaging system can include at least one stop, such as an aperture stop, a glare stop or a field stop. The glare stop or the field stop is for eliminating the stray light and thereby improving the image resolution thereof.

According to the imaging system of the present disclosure, the imaging system can be optionally applied to moving focus optical systems. Furthermore, the imaging system is featured with good correction ability and high image quality, and can be applied to 3D (three-dimensional) image capturing applications, in products such as digital cameras, mobile devices, digital tablets, smart TVs, network monitoring devices, motion sensing input devices, driving recorders, rear view camera systems, wearable devices and other electronic imaging products.

According to the present disclosure, an image capturing apparatus is provided. The image capturing apparatus includes the aforementioned imaging system according to the present disclosure and an image sensor, wherein the image sensor is disposed on or near an image surface of the aforementioned imaging system. In the imaging system of the image capturing apparatus, it is favorable for balancing the thickness between the paraxial regions and the off-axis regions of the fourth lens element and the fifth lens element so as to reduce molding problems from excessive lens thickness variation. Moreover, it is favorable for arranging the third lens element, the fourth lens element and the fifth lens element so as to reduce the collision probability among the lens elements during assembling. In addition, it is favorable for solving the problems of the image center excessively corrected and balancing the correction of chromatic aberration and the high-order aberration. Preferably, the image capturing apparatus can further include a barrel member, a holder member or a combination thereof.

According to the present disclosure, an electronic device is provided, wherein the electronic device includes the aforementioned image capturing apparatus. Therefore, it is favorable for molding, assembling, obtaining proper refractive power and satisfying the requirements of relative illumination in the peripheral regions of the imaging system with short total track length. Preferably, the electronic device can further include but not limited to a control unit, a display, a storage unit, a random access memory unit (RAM) or a combination thereof.

According to the above description of the present disclosure, the following 1st-13th specific embodiments are provided for further explanation.

1st Embodiment

Figure 2:
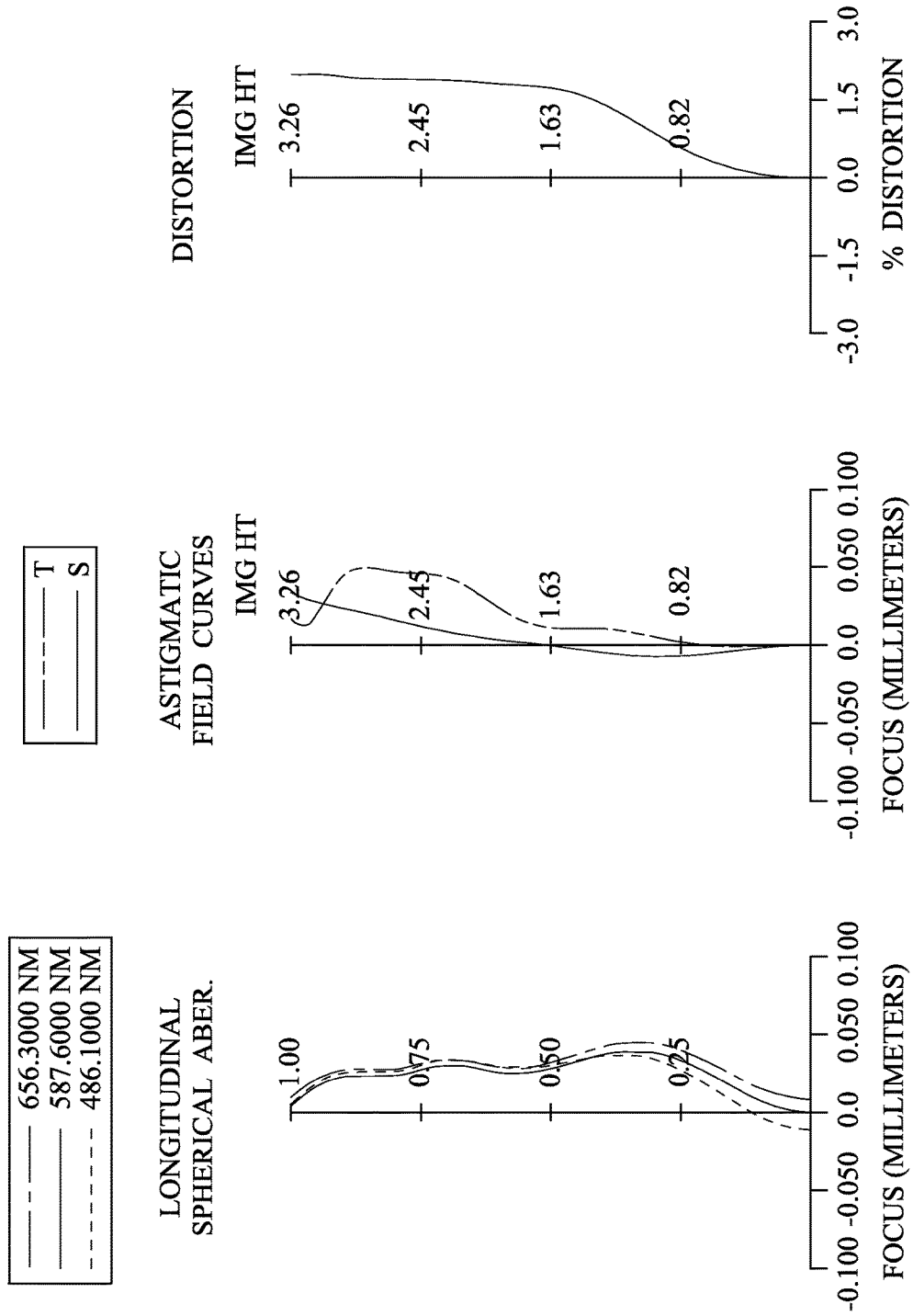
FIG. 2 shows spherical aberration curves, astigmatic field curves and a distortion curve of the image capturing apparatus according to the 1st embodiment.

FIG. 1 is a schematic view of an image capturing apparatus according to the 1st embodiment of the present disclosure. FIG. 2 shows, in order from left to right, spherical aberration curves, astigmatic field curves and a distortion curve of the image capturing apparatus according to the 1st embodiment.

In FIG. 1, the image capturing apparatus includes the imaging system (its reference numeral is omitted) and an image sensor 180. The imaging system includes, in order from an object side to an image side, an aperture stop 100, a first lens element 110, a second lens element 120, a third lens element 130, a fourth lens element 140, a fifth lens element 150, an IR-cut filter 160 and an image surface 170. The image sensor 180 is disposed on the image surface 170 of the imaging system. The imaging system has a total of five lens elements (110-150) with refractive power. Moreover, there is an air gap between any two of the first lens element 110, the second lens element 120, the third lens element 130, the fourth lens element 140 and the fifth lens element 150 that are adjacent to each other.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power has an object-side surface 131 being concave in a paraxial region thereof and an image-side surface 132 being convex in a paraxial region thereof. The third lens element 130 is made of plastic material and has the object-side surface 131 and the image-side surface 132 being both aspheric.

The fourth lens element 140 with positive refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. Furthermore, the image-side surface 142 of the fourth lens element 140 includes at least one convex shape in an off-axis region thereof.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. Furthermore, the image-side surface 152 of the fifth lens element 150 includes at least one convex shape in an off-axis region thereof.

The IR-cut filter 160 is made of glass material and located between the fifth lens element 150 and the image surface 170, and will not affect the focal length of the imaging system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the imaging system of the image capturing apparatus according to the 1st embodiment, when a focal length of the imaging system is f, an f-number of the imaging system is Fno, and half of a maximal field of view of the imaging system is HFOV, these parameters have the following values: f=4.26 mm; Fno=2.12; and HFOV=36.7 degrees.

In the imaging system of the image capturing apparatus according to the 1st embodiment, when an Abbe number of the second lens element 120 is V2, an Abbe number of the third lens element 130 is V3, and an Abbe number of the fourth lens element 140 is V4, the following conditions are satisfied: V2+V3+V4=77.2; (V2+V4)/V3=2.02; and V3=25.6.

In the imaging system of the image capturing apparatus according to the 1st embodiment, when a central thickness of the second lens element 120 is CT2, a central thickness of the third lens element 130 is CT3, a central thickness of the fourth lens element 140 is CT4, and a central thickness of the fifth lens element 150 is CT5, the following condition is satisfied: (CT2+CT3+CT4)/CT5=1.19.

In the imaging system of the image capturing apparatus according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, and a sum of axial distances between any two of the first lens element 110, the second lens element 120, the third lens element 130, the fourth lens element 140 and the fifth lens element 150 that are adjacent to each other is ΣAT (ΣAT=T12+T23+T34+T45), the following condition is satisfied: (T34+T45)/ΣAT=0.67.

In the imaging system of the image capturing apparatus according to the 1st embodiment, when the central thickness of the fourth lens element 140 is CT4, and the axial distance between the third lens element 130 and the fourth lens element 140 is T34, the following condition is satisfied: CT4/T34=0.75.

In the imaging system of the image capturing apparatus according to the 1st embodiment, when the central thickness of the fourth lens element 140 is CT4, and the axial distance between the fourth lens element 140 and the fifth lens element 150 is T45, the following condition is satisfied: CT4/T45=0.85.

In the imaging system of the image capturing apparatus according to the 1st embodiment, when an axial distance between the object-side surface 111 of the first lens element 110 and the image surface 170 is TL, the following condition is satisfied: TL=4.79 mm.

In the imaging system of the image capturing apparatus according to the 1st embodiment, when the focal length of the imaging system is f, a curvature radius of the object-side surface 131 of the third lens element 130 is R5, and a curvature radius of the image-side surface 132 of the third lens element 130 is R6, the following condition is satisfied: |f/R5|+|f/R6|=0.30.

In the imaging system of the image capturing apparatus according to the 1st embodiment, when a curvature radius of the object-side surface 141 of the fourth lens element 140 is R7, and the focal length of the imaging system is f, the following condition is satisfied: |R7/f|=0.87.

In the imaging system of the image capturing apparatus according to the 1st embodiment, when the curvature radius of the object-side surface 141 of the fourth lens element 140 is R7, a curvature radius of the image-side surface 142 of the fourth lens element 140 is R8, a curvature radius of the object-side surface 151 of the fifth lens element 150 is R9, a curvature radius of the image-side surface 152 of the fifth lens element 150 is R10, and the focal length of the imaging system is f, the following condition is satisfied: (|R7|+|R8|+|R9|+|R10|)/f=2.81.

In the imaging system of the image capturing apparatus according to the 1st embodiment, when the curvature radius of the image-side surface 142 of the fourth lens element 140 is R8, and the curvature radius of the object-side surface 151 of the fifth lens element 150 is R9, the following condition is satisfied: R8/R9=1.39.

In the imaging system of the image capturing apparatus according to the 1st embodiment, when the focal length of the imaging system is f, a focal length of the third lens element 130 is f3, a focal length of the fourth lens element 140 is f4, and a focal length of the fifth lens element 150 is f5, the following condition is satisfied: |f/f3|+|f/f4|+|f/f5|=0.37.

Furthermore, in the imaging system of the image capturing apparatus according to the 1st embodiment, when a central thickness of the first lens element 110 is CT1, the central thickness of the second lens element 120 is CT2, the central thickness of the third lens element 130 is CT3, the central thickness of the fourth lens element 140 is CT4, and the central thickness of the fifth lens element 150 is CT5, CT5 is larger than CT1, CT2, CT3, and CT4.

The detailed optical data of the 1st embodiment are shown in TABLE 1 and the aspheric surface data are shown in TABLE 2 below.

TABLE 1

1st Embodiment
f = 4.26 mm, Fno = 2.12, HFOV = 36.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.393 | | | | |
| 2 | Lens 1 | 1.434 | ASP | 0.629 | Plastic | 1.535 | 55.7 | 3.00 |
| 3 | | 11.535 | ASP | 0.052 | | | | |
| 4 | Lens 2 | 16.839 | ASP | 0.230 | Plastic | 1.650 | 21.4 | −6.97 |
| 5 | | 3.549 | ASP | 0.379 | | | | |
| 6 | Lens 3 | −22.317 | ASP | 0.407 | Plastic | 1.614 | 25.6 | −90.02 |
| 7 | | −37.683 | ASP | 0.459 | | | | |
| 8 | Lens 4 | 3.714 | ASP | 0.344 | Plastic | 1.583 | 30.2 | 141.80 |
| 9 | | 3.756 | ASP | 0.403 | | | | |
| 10 | Lens 5 | 2.710 | ASP | 0.821 | Plastic | 1.530 | 55.8 | −14.65 |
| 11 | | 1.798 | ASP | 0.500 | | | | |

TABLE 1-continued

1st Embodiment
f = 4.26 mm, Fno = 2.12, HFOV = 36.7 deg.

| Surface # | | Curvature Radius | Thickness | Material | Index | Abbe # | Focal Length |
|---|---|---|---|---|---|---|---|
| 12 | IR-cut filter | Plano | 0.210 | Glass | 1.517 | 64.2 | — |
| 13 | | Plano | 0.355 | | | | |
| 14 | Image | Plano | — | | | | |

Note:
Reference wavelength is 587.6 nm (d-line).

TABLE 2

Aspheric Coefficients

| Surface # | 2 | 3 | 4 | 5 | 6 |
|---|---|---|---|---|---|
| k = | −3.9057E+00 | 8.1126E+01 | −6.7700E+01 | −2.7476E+01 | 8.4244E+01 |
| A4 = | 1.4800E−01 | −2.0100E−01 | −2.5701E−01 | −3.7903E−02 | −1.7204E−01 |
| A6 = | 3.1631E−02 | 4.0070E−01 | 7.1822E−01 | 4.4152E−01 | 3.0087E−02 |
| A8 = | −2.1381E−01 | −3.2339E−01 | −8.1482E−01 | −1.1901E+00 | −5.1244E−02 |
| A10 = | 3.0089E−01 | 6.1536E−02 | 5.9678E−01 | 3.2337E+00 | 4.0113E−01 |
| A12 = | −1.4879E−01 | −1.1828E−03 | −4.0758E−01 | −5.6090E+00 | −9.7297E−01 |
| A14 = | −5.6929E−05 | 1.4320E−03 | 2.5424E−01 | 5.1544E+00 | 1.0740E+00 |
| A16 = | −6.3564E−05 | −3.9417E−04 | −6.9494E−02 | −1.8174E+00 | −4.0524E−01 |

| Surface # | 7 | 8 | 9 | 10 | 11 |
|---|---|---|---|---|---|
| k = | −9.0000E+01 | −7.3247E+01 | −7.1121E+01 | −1.9266E+01 | −6.5499E+00 |
| A4 = | −1.4988E−01 | 4.5048E−02 | −2.7074E−02 | −1.5012E−01 | −8.1795E−02 |
| A6 = | −3.4820E−03 | −2.2075E−01 | −8.4917E−03 | 3.2235E−02 | 2.9107E−02 |
| A8 = | 1.3167E−01 | 2.5995E−01 | −1.9701E−02 | 5.6233E−03 | −1.1326E−02 |
| A10 = | −1.9575E−01 | −2.6800E−01 | 1.8416E−02 | −2.8060E−03 | 3.3138E−03 |
| A12 = | 1.8094E−01 | 1.7767E−01 | −6.4598E−03 | 2.9319E−04 | −6.1702E−04 |
| A14 = | −7.5692E−02 | −6.6427E−02 | 1.1475E−03 | 5.1258E−06 | 6.2622E−05 |
| A16 = | 1.8109E−02 | 1.0581E−02 | −9.7581E−05 | −1.7248E−06 | −2.5742E−06 |

In TABLE 1, the curvature radius, the thickness and the focal length are shown in millimeters (mm). Surface numbers 0-14 represent the surfaces sequentially arranged from the object-side to the image-side along the optical axis. In TABLE 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as TABLE 1 and TABLE 2 of the 1st embodiment. Therefore, an explanation in this regard will not be provided again.

2nd Embodiment

Figure 3:
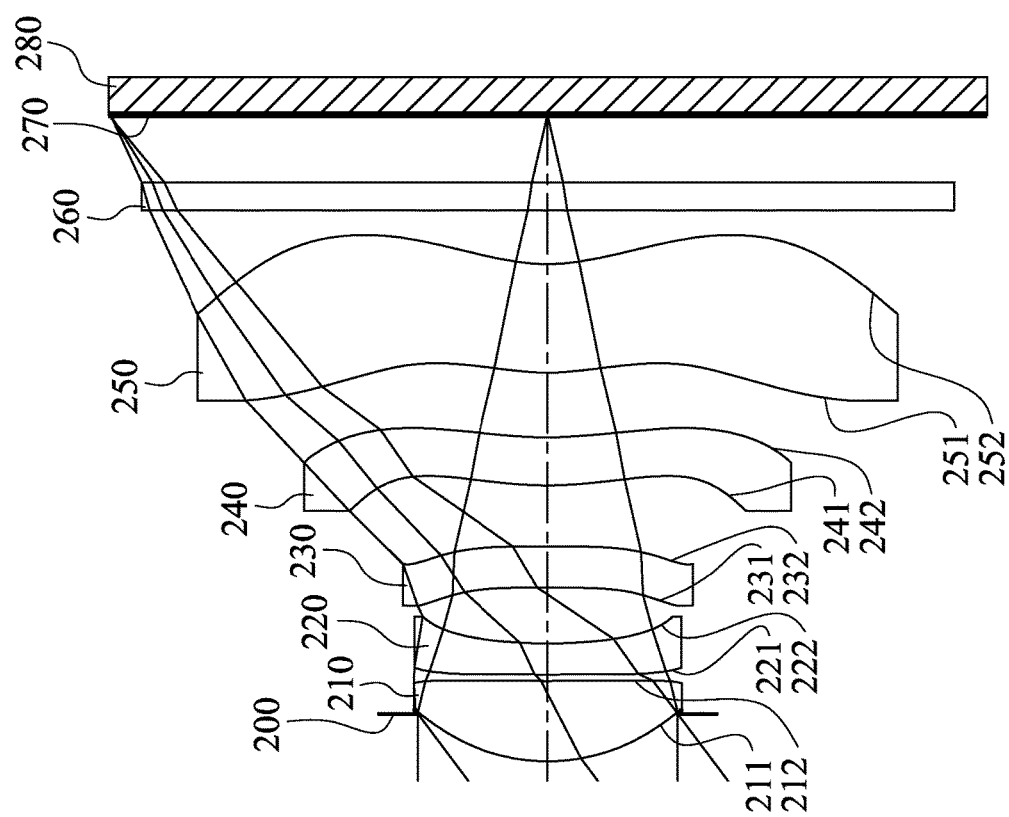
FIG. 3 is a schematic view of an image capturing apparatus according to the 2nd embodiment of the present disclosure.
Figure 4:
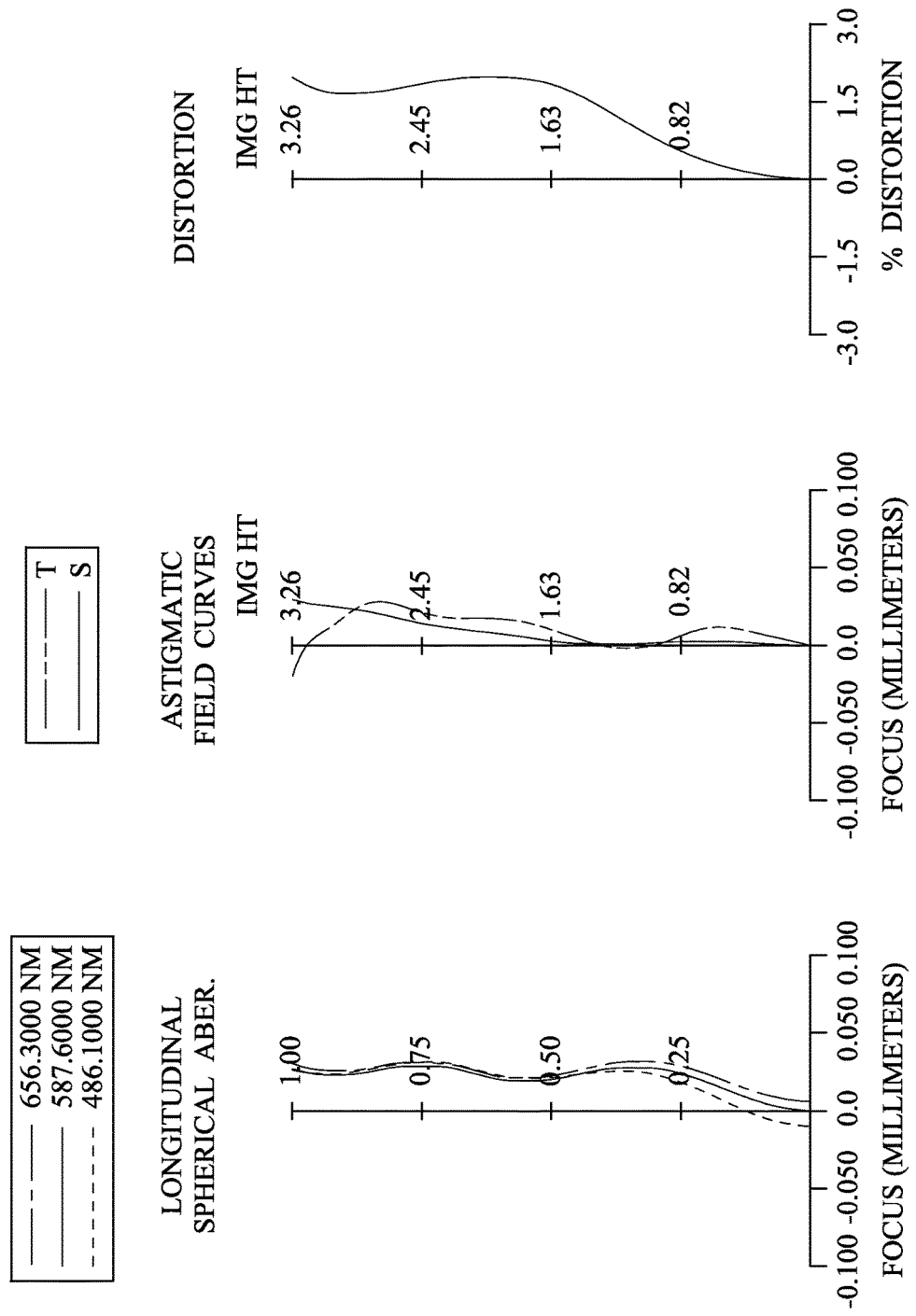
FIG. 4 shows spherical aberration curves, astigmatic field curves and a distortion curve of the image capturing apparatus according to the 2nd embodiment.

FIG. 3 is a schematic view of an image capturing apparatus according to the 2nd embodiment of the present disclosure. FIG. 4 shows, in order from left to right, spherical aberration curves, astigmatic field curves and a distortion curve of the image capturing apparatus according to the 2nd embodiment.

In FIG. 3, the image capturing apparatus includes the imaging system (its reference numeral is omitted) and an image sensor 280. The imaging system includes, in order from an object side to an image side, an aperture stop 200, a first lens element 210, a second lens element 220, a third lens element 230, a fourth lens element 240, a fifth lens element 250, an IR-cut filter 260 and an image surface 270. The image sensor 280 is disposed on the image surface 270 of the imaging system. The imaging system has a total of five lens elements (210-250) with refractive power. Moreover, there is an air gap between any two of the first lens element 210, the second lens element 220, the third lens element 230, the fourth lens element 240 and the fifth lens element 250 that are adjacent to each other.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with negative refractive power has an object-side surface 231 being concave in a paraxial region thereof and an image-side surface 232 being concave in a paraxial region thereof. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. Furthermore, the image-side surface 242 of the fourth lens element 240 includes at least one convex shape in an off-axis region thereof.

The fifth lens element 250 with negative refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. Furthermore, the image-side surface 252 of the fifth lens element 250 includes at least one convex shape in an off-axis region thereof.

The IR-cut filter 260 is made of glass material and located between the fifth lens element 250 and the image surface 270, and will not affect the focal length of the imaging system.

Furthermore, in the imaging system of the image capturing apparatus according to the 2nd embodiment, when a central thickness of the first lens element 210 is CT1, a central thickness of the second lens element 220 is CT2, a central thickness of the third lens element 230 is CT3, a central thickness of the fourth lens element 240 is CT4, and a central thickness of the fifth lens element 250 is CT5, CT5 is larger than CT1, CT2, CT3, and CT4.

The detailed optical data of the 2nd embodiment are shown in TABLE 3 and the aspheric surface data are shown in TABLE 4 below.

TABLE 3

2nd Embodiment
f = 4.26 mm, Fno = 2.20, HFOV = 36.7 deg.

| Surface # |  | Curvature Radius | Thickness | Material | Index | Abbe # | Focal Length |
|---|---|---|---|---|---|---|---|
| 0 | Object | Plano | Infinity |  |  |  |  |
| 1 | Ape. Stop | Plano | −0.355 |  |  |  |  |
| 2 | Lens 1 | 1.433 ASP | 0.598 | Plastic | 1.514 | 56.8 | 3.08 |
| 3 |  | 13.186 ASP | 0.049 |  |  |  |  |
| 4 | Lens 2 | 14.070 ASP | 0.230 | Plastic | 1.645 | 22.5 | −6.75 |
| 5 |  | 3.301 ASP | 0.418 |  |  |  |  |
| 6 | Lens 3 | −29.974 ASP | 0.310 | Plastic | 1.645 | 22.5 | −39.96 |
| 7 |  | 184.090 ASP | 0.455 |  |  |  |  |
| 8 | Lens 4 | 2.592 ASP | 0.358 | Plastic | 1.583 | 30.2 | 142.22 |
| 9 |  | 2.539 ASP | 0.482 |  |  |  |  |
| 10 | Lens 5 | 1.857 ASP | 0.813 | Plastic | 1.514 | 56.8 | −42.57 |
| 11 |  | 1.458 ASP | 0.400 |  |  |  |  |
| 12 | IR-cut filter | Plano | 0.210 | Glass | 1.517 | 64.2 | — |
| 13 |  | Plano | 0.502 |  |  |  |  |
| 14 | Image | Plano | — |  |  |  |  |

Note:
Reference wavelength is 587.6 nm (d-line).

TABLE 4

Aspheric Coefficients

| Surface # | 2 | 3 | 4 | 5 | 6 |
|---|---|---|---|---|---|
| k = | −3.2975E+00 | 8.1912E+01 | 8.7117E+01 | −2.2073E+01 | 8.4244E+01 |
| A4 = | 1.2862E−01 | −1.9618E−01 | −2.5172E−01 | −3.2237E−02 | −2.2106E−01 |
| A6 = | 3.9649E−02 | 4.0625E−01 | 6.9076E−01 | 4.4486E−01 | 1.7191E−01 |
| A8 = | −2.0150E−01 | −3.3533E−01 | −8.0504E−01 | −1.2562E+00 | −7.4596E−01 |
| A10 = | 2.9272E−01 | 5.6801E−02 | 5.8341E−01 | 3.3213E+00 | 2.2556E+00 |
| A12 = | −1.5467E−01 | 5.4258E−03 | −3.8992E−01 | −5.6475E+00 | −3.8055E+00 |
| A14 = | 3.7769E−04 | 4.4390E−03 | 2.5390E−01 | 5.1544E+00 | 3.3412E+00 |
| A16 = | −6.3564E−05 | −3.9417E−04 | −6.9494E−02 | −1.8174E+00 | −1.1189E+00 |

| Surface # | 7 | 8 | 9 | 10 | 11 |
|---|---|---|---|---|---|
| k = | −9.0000E+01 | −6.0541E+01 | −7.1121E+01 | −1.8799E+01 | −7.5324E+00 |
| A4 = | −2.3927E−01 | 7.4805E−02 | −1.5020E−02 | −1.1421E−01 | −5.3886E−02 |
| A6 = | 2.7268E−01 | −1.9078E−01 | 2.8248E−02 | 1.1840E−02 | 1.1688E−02 |
| A8 = | −7.2621E−01 | 1.7742E−01 | −6.3923E−02 | 1.2119E−02 | −3.3240E−03 |
| A10 = | 1.3911E+00 | −1.5111E−01 | 4.4907E−02 | −4.4270E−03 | 8.1285E−04 |
| A12 = | −1.5388E+00 | 8.7045E−02 | −1.5386E−02 | 5.6610E−04 | −1.3714E−04 |
| A14 = | 9.2822E−01 | −2.8469E−02 | 2.6362E−03 | −1.9588E−05 | 1.2803E−05 |
| A16 = | −2.1942E−01 | 3.9818E−03 | −1.8365E−04 | −8.2651E−07 | −4.6805E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from TABLE 3 and TABLE 4 as the following values and satisfy the following conditions:

| 2nd Embodiment | | | |
|---|---|---|---|
| f (mm) | 4.26 | CT4/T34 | 0.79 |
| Fno | 2.20 | CT4/T45 | 0.74 |
| HFOV (deg.) | 36.7 | TL (mm) | 4.83 |
| V2 + V3 + V4 | 75.2 | |f/R5| + |f/R6| | 0.17 |
| (V2 + V4)/V3 | 2.34 | |R7/f| | 0.61 |
| V3 | 22.5 | (|R7| + |R8| + |R9| + |R10|)/f | 1.98 |
| (CT2 + CT3 + CT4)/CT5 | 1.10 | R8/R9 | 1.37 |
| (T34 + T45)/ΣAT | 0.67 | |f/f3| + |f/f4| + |f/f5| | 0.24 |

3rd Embodiment

Figure 5:
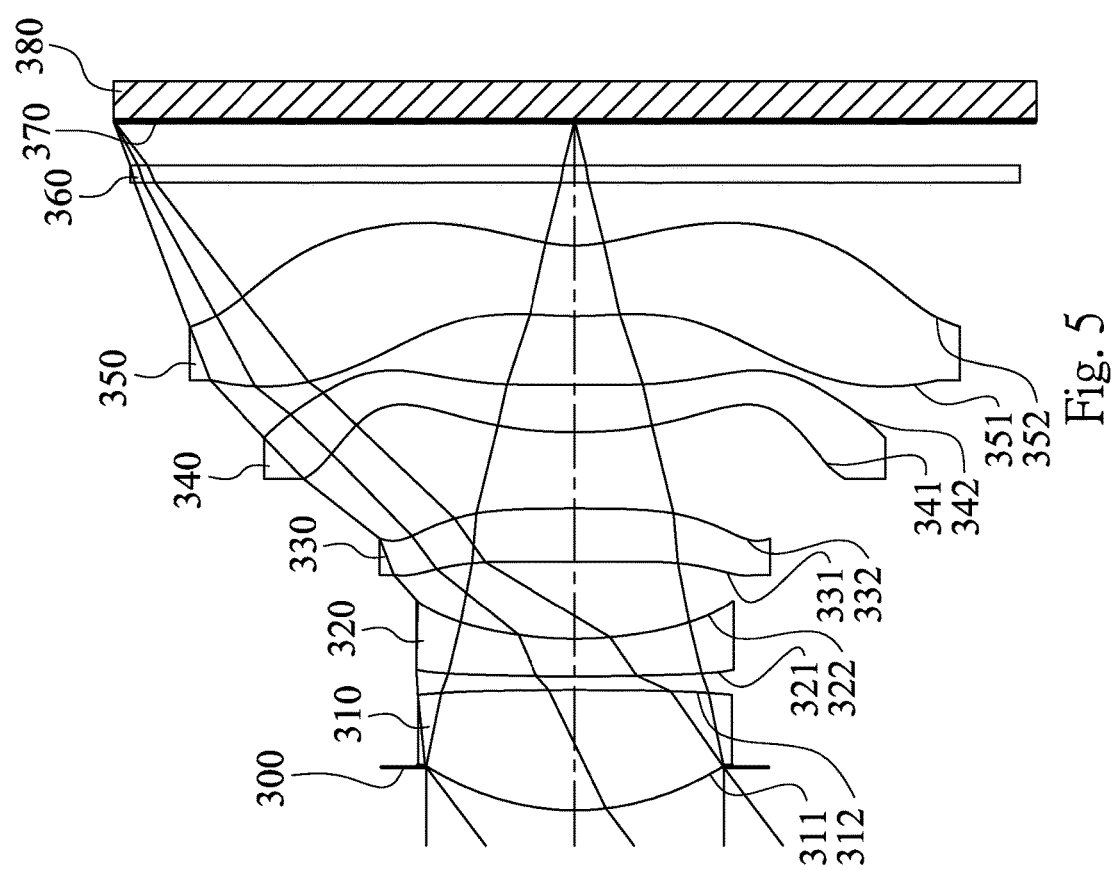
FIG. 5 is a schematic view of an image capturing apparatus according to the 3rd embodiment of the present disclosure.
Figure 6:
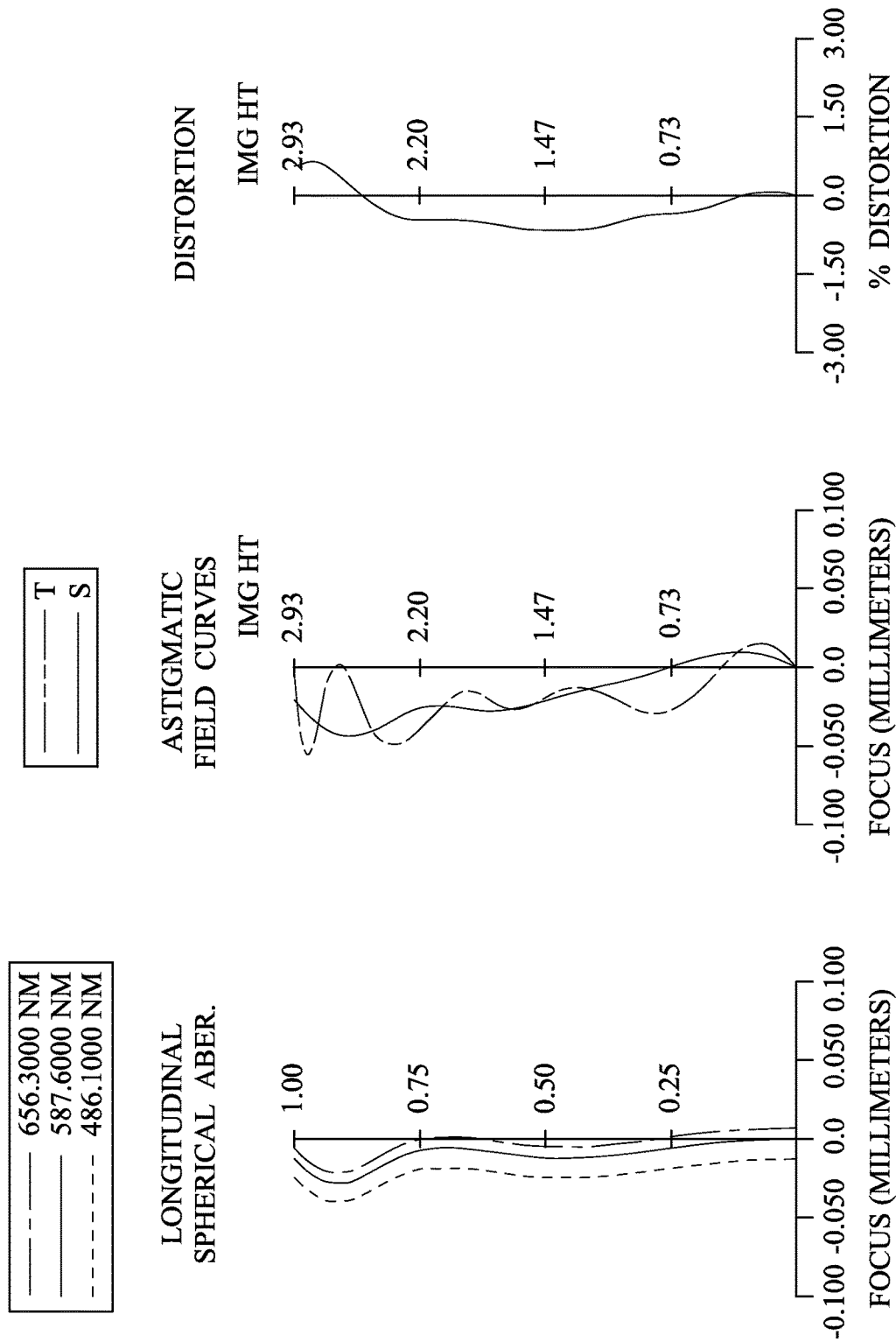
FIG. 6 shows spherical aberration curves, astigmatic field curves and a distortion curve of the image capturing apparatus according to the 3rd embodiment.

FIG. 5 is a schematic view of an image capturing apparatus according to the 3rd embodiment of the present disclosure. FIG. 6 shows, in order from left to right, spherical aberration curves, astigmatic field curves and a distortion curve of the image capturing apparatus according to the 3rd embodiment.

In FIG. 5, the image capturing apparatus includes the imaging system (its reference numeral is omitted) and an image sensor 380. The imaging system includes, in order from an object side to an image side, an aperture stop 300, a first lens element 310, a second lens element 320, a third lens element 330, a fourth lens element 340, a fifth lens element 350, an IR-cut filter 360 and an image surface 370. The image sensor 380 is disposed on the image surface 370 of the imaging system. The imaging system has a total of five lens elements (310-350) with refractive power. Moreover, there is an air gap between any two of the first lens element 310, the second lens element 320, the third lens element 330, the fourth lens element 340 and the fifth lens element 350 that are adjacent to each other.

The first lens element 310 with positive refractive power has an object-side surface 311 being convex in a paraxial region thereof and an image-side surface 312 being convex in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric.

The fourth lens element 340 with positive refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. Furthermore, the image-side surface 342 of the fourth lens element 340 includes at least one convex shape in an off-axis region thereof.

The fifth lens element 350 with negative refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. Furthermore, the image-side surface 352 of the fifth lens element 350 includes at least one convex shape in an off-axis region thereof.

The IR-cut filter 360 is made of glass material and located between the fifth lens element 350 and the image surface 370, and will not affect the focal length of the imaging system.

Furthermore, in the imaging system of the image capturing apparatus according to the 3rd embodiment, when a focal length of the first lens element 310 is f1, a focal length of the second lens element 320 is f2, a focal length of the third lens element 330 is f3, a focal length of the fourth lens element 340 is to f4, and a focal length of the fifth lens element 350 is f5, the following conditions are satisfied: |f3|>|f1|, |f3|>|f2|, |f3|>|f4|, and |f3|>|f5|.

The detailed optical data of the 3rd embodiment are shown in TABLE 5 and the aspheric surface data are shown in TABLE 6 below.

TABLE 5

3rd Embodiment
f = 3.88 mm, Fno = 2.05, HFOV = 37.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.275 | | | | |
| 2 | Lens 1 | 1.681 | ASP | 0.766 | Plastic | 1.544 | 55.9 | 2.92 |
| 3 | | −24.398 | ASP | 0.085 | | | | |
| 4 | Lens 2 | 12.507 | ASP | 0.240 | Plastic | 1.640 | 23.3 | −4.87 |
| 5 | | 2.474 | ASP | 0.492 | | | | |
| 6 | Lens 3 | 13.266 | ASP | 0.340 | Plastic | 1.554 | 41.1 | 16.00 |
| 7 | | −26.498 | ASP | 0.485 | | | | |
| 8 | Lens 4 | 3.385 | ASP | 0.300 | Plastic | 1.530 | 56.0 | 6.60 |
| 9 | | 100.000 | ASP | 0.442 | | | | |
| 10 | Lens 5 | 2.392 | ASP | 0.450 | Plastic | 1.544 | 55.9 | −3.04 |
| 11 | | 0.914 | ASP | 0.400 | | | | |

TABLE 5-continued

3rd Embodiment
f = 3.88 mm, Fno = 2.05, HFOV = 37.0 deg.

| Surface # | | Curvature Radius | Thickness | Material | Index | Abbe # | Focal Length |
|---|---|---|---|---|---|---|---|
| 12 | IR-cut filter | Plano | 0.110 | Glass | 1.517 | 64.2 | — |
| 13 | | Plano | 0.280 | | | | |
| 14 | Image | Plano | — | | | | |

Note:
Reference wavelength is 587.6 nm (d-line).

TABLE 6

Aspheric Coefficients

| Surface # | 2 | 3 | 4 | 5 | 6 |
|---|---|---|---|---|---|
| k = | 3.1504E−01 | −9.0000E+01 | −9.0000E+01 | −2.3442E+01 | 2.5892E+01 |
| A4 = | −2.1840E−02 | −2.5550E−02 | −6.5043E−02 | 1.1877E−01 | −9.6721E−02 |
| A6 = | 4.1620E−02 | 1.4387E−01 | 2.1920E−01 | −5.6213E−02 | −2.5499E−01 |
| A8 = | −1.2173E−01 | −3.9128E−01 | −4.5499E−01 | 1.9730E−03 | 7.8349E−01 |
| A10 = | 1.2637E−01 | 4.4331E−01 | 4.9730E−01 | 6.0775E−02 | −1.2050E+00 |
| A12 = | −5.4821E−02 | −1.8355E−01 | −1.9159E−01 | −1.3858E−02 | 9.3455E−01 |
| A14 = | | | | | −2.9675E−01 |
| A16 = | | | | | 2.1621E−02 |

| Surface # | 7 | 8 | 9 | 10 | 11 |
|---|---|---|---|---|---|
| k = | 8.9907E+01 | 7.0929E−01 | 6.5412E+01 | −9.0000E+01 | −9.7455E+00 |
| A4 = | −1.2255E−01 | 1.6038E−01 | 1.2485E−01 | −4.4319E−01 | −1.6104E−01 |
| A6 = | −1.4590E−01 | −2.5373E−01 | 1.5214E−01 | 3.3110E−01 | 6.9374E−02 |
| A8 = | 1.8144E−01 | 2.0345E−01 | −1.1281E−01 | −1.3212E−01 | −1.6428E−02 |
| A10 = | 1.2357E−01 | −1.3552E−01 | 5.8076E−02 | 3.3089E−02 | 1.5595E−03 |
| A12 = | −4.4768E−01 | 4.3918E−02 | −1.1670E−02 | −5.1641E−03 | −2.2552E−05 |
| A14 = | 3.6866E−01 | −5.0155E−03 | 8.4596E−04 | 4.5828E−04 | 5.7368E−06 |
| A16 = | −9.5760E−02 | | | −1.7642E−05 | −1.0894E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from TABLE 5 and TABLE 6 as the following values and satisfy the following conditions:

| 3rd Embodiment | | | |
|---|---|---|---|
| f (mm) | 3.88 | CT4/T34 | 0.62 |
| Fno | 2.05 | CT4/T45 | 0.68 |
| HFOV (deg.) | 37.0 | TL (mm) | 4.39 |
| V2 + V3 + V4 | 120.4 | \|f/R5\| + \|f/R6\| | 0.44 |
| (V2 + V4)/V3 | 1.93 | \|R7/f\| | 0.87 |
| V3 | 41.1 | (\|R7\| + \|R8\| + \|R9\| + \|R10\|)/f | 27.50 |
| (CT2 + CT3 + CT4)/CT5 | 1.96 | R8/R9 | 41.81 |
| (T34 + T45)/ΣAT | 0.62 | \|f/f3\| + \|f/f4\| + \|f/f5\| | 2.11 |

4th Embodiment

Figure 7:
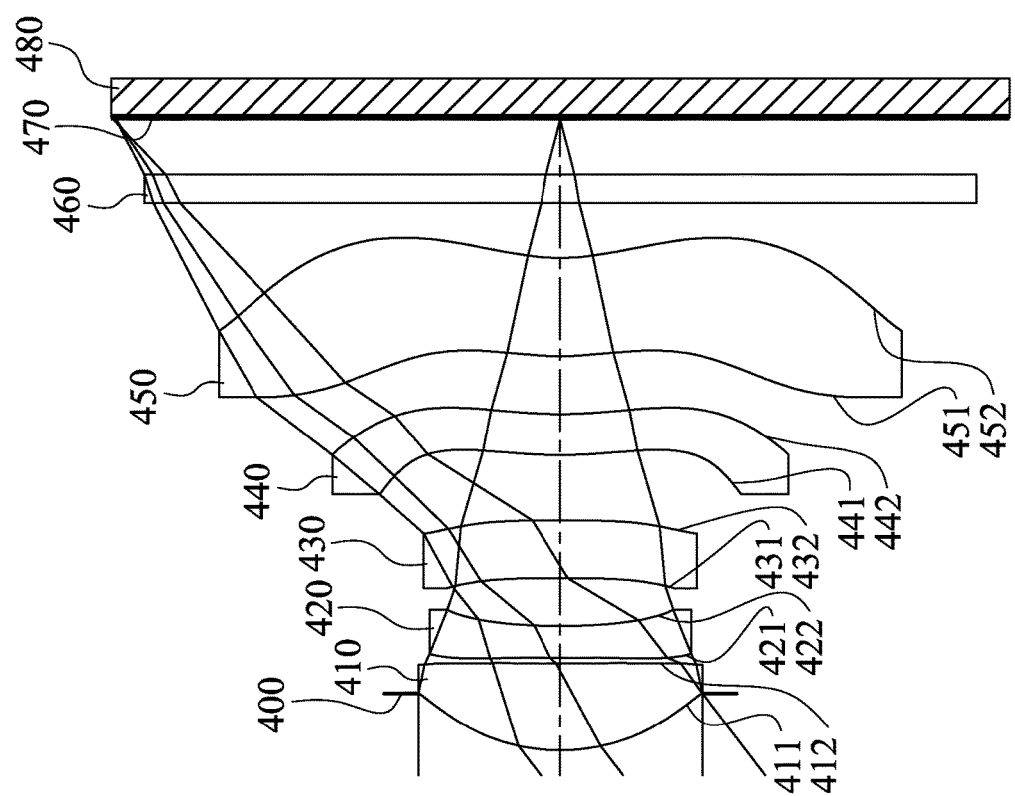
FIG. 7 is a schematic view of an image capturing apparatus according to the 4th embodiment of the present disclosure.
Figure 8:
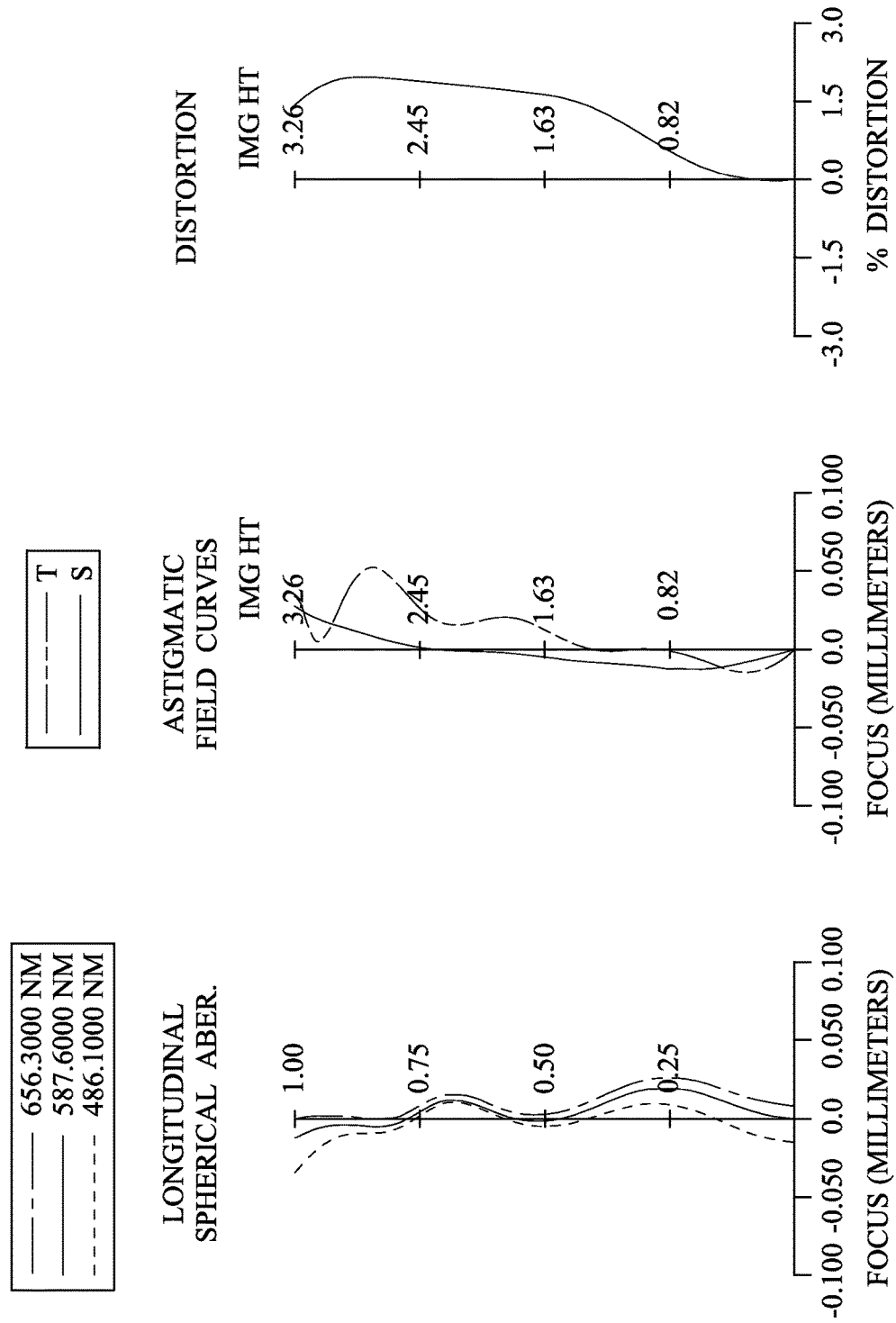
FIG. 8 shows spherical aberration curves, astigmatic field curves and a distortion curve of the image capturing apparatus according to the 4th embodiment.

FIG. 7 is a schematic view of an image capturing apparatus according to the 4th embodiment of the present disclosure. FIG. 8 shows, in order from left to right, spherical aberration curves, astigmatic field curves and a distortion curve of the image capturing apparatus according to the 4th embodiment.

In FIG. 7, the image capturing apparatus includes the imaging system (its reference numeral is omitted) and an image sensor 480. The imaging system includes, in order from an object side to an image side, an aperture stop 400, a first lens element 410, a second lens element 420, a third lens element 430, a fourth lens element 440, a fifth lens element 450, an IR-cut filter 460 and an image surface 470. The image sensor 480 is disposed on the image surface 470 of the imaging system. The imaging system has a total of five lens elements (410-450) with refractive power. Moreover, there is an air gap between any two of the first lens element 410, the second lens element 420, the third lens element 430, the fourth lens element 440 and the fifth lens element 450 that are adjacent to each other.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive power has an object-side surface 431 being concave in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. Furthermore, the image-side surface 442 of the fourth lens element 440 includes at least one convex shape in an off-axis region thereof.

The fifth lens element 450 with negative refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. Furthermore, the image-side surface 452 of the fifth lens element 450 includes at least one convex shape in an off-axis region thereof.

The IR-cut filter 460 is made of glass material and located between the fifth lens element 450 and the image surface 470, and will not affect the focal length of the imaging system.

Furthermore, in the imaging system of the image capturing apparatus according to the 4th embodiment, when a focal length of the first lens element 410 is f1, a focal length of the second lens element 420 is f2, a focal length of the third lens element 430 is f3, a focal length of the fourth lens element 440 is f4, and a focal length of the fifth lens element 450 is f5, the following conditions are satisfied: |f3|>|f1|, |f3|>|f2|, |f3|>|f4|, and |f3|>|f5|.

In the imaging system of the image capturing apparatus according to the 4th embodiment, when a central thickness of the first lens element 410 is CT1, a central thickness of the second lens element 420 is CT2, a central thickness of the third lens element 430 is CT3, a central thickness of the fourth lens element 440 is CT4, and a central thickness of the fifth lens element 450 is CT5, CT5 is larger than CT1, CT2, CT3, and CT4.

The detailed optical data of the 4th embodiment are shown in TABLE 7 and the aspheric surface data are shown in TABLE 8 below.

TABLE 7

4th Embodiment
f = 4.20 mm, Fno = 2.02, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.417 | | | | |
| 2 | Lens 1 | 1.419 | ASP | 0.637 | Plastic | 1.544 | 55.9 | 2.88 |
| 3 | | 12.648 | ASP | 0.042 | | | | |
| 4 | Lens 2 | 42.726 | ASP | 0.231 | Plastic | 1.639 | 23.5 | −6.52 |
| 5 | | 3.787 | ASP | 0.352 | | | | |
| 6 | Lens 3 | −24.176 | ASP | 0.422 | Plastic | 1.639 | 23.5 | 319.05 |
| 7 | | −21.760 | ASP | 0.478 | | | | |
| 8 | Lens 4 | 3.100 | ASP | 0.300 | Plastic | 1.639 | 23.5 | −31.33 |
| 9 | | 2.583 | ASP | 0.425 | | | | |
| 10 | Lens 5 | 2.190 | ASP | 0.718 | Plastic | 1.535 | 55.7 | −20.15 |
| 11 | | 1.612 | ASP | 0.400 | | | | |
| 12 | IR-cut filter | Plano | | 0.210 | Glass | 1.517 | 64.2 | — |
| 13 | | Plano | | 0.423 | | | | |
| 14 | Image | Plano | | — | | | | |

Note 1:
Reference wavelength is 587.6 nm (d-line).
Note 2:
Effective radius of Surface 7 is 1.000 mm.

TABLE 8

Aspheric Coefficients

| Surface # | 2 | 3 | 4 | 5 | 6 |
|---|---|---|---|---|---|
| k = | −3.9476E+00 | 8.9901E+01 | −2.0380E+01 | −2.8496E+01 | 3.4515E+01 |
| A4 = | 1.5297E−01 | −2.1027E−01 | −2.4650E−01 | −2.2997E−02 | −1.5694E−01 |
| A6 = | 3.1489E−02 | 4.0102E−01 | 6.6342E−01 | 3.2066E−01 | 9.5730E−02 |
| A8 = | −2.1796E−01 | −3.1333E−01 | −6.6259E−01 | −3.3200E−01 | −3.1930E−01 |
| A10 = | 2.9932E−01 | 7.0404E−02 | 3.2112E−01 | 1.0412E−01 | 7.3215E−01 |
| A12 = | −1.4745E−01 | −5.8330E−03 | −4.1919E−02 | 1.3084E−01 | −7.9272E−01 |
| A14 = | | | | | 3.6953E−01 |

| Surface # | 7 | 8 | 9 | 10 | 11 |
|---|---|---|---|---|---|
| k = | 5.3708E+01 | −8.9984E+01 | −8.8257E+01 | −2.9545E+01 | −8.3226E+00 |
| A4 = | −1.5089E−01 | 2.2868E−02 | 5.5897E−03 | −1.5191E−01 | −9.0796E−02 |
| A6 = | 1.3885E−01 | −1.4897E−01 | −9.3236E−02 | 2.6556E−02 | 3.3934E−02 |
| A8 = | −2.9620E−01 | 4.7563E−02 | 6.8103E−02 | 1.1409E−02 | −1.3919E−02 |
| A10 = | 4.7549E−01 | 3.0241E−02 | −3.4918E−02 | −5.0152E−03 | 4.1787E−03 |
| A12 = | −3.7435E−01 | −4.7233E−02 | 1.0767E−02 | 7.2775E−04 | −7.8191E−04 |
| A14 = | 1.3433E−01 | 1.4791E−02 | −1.3291E−03 | −3.9272E−05 | 7.9620E−05 |
| A16 = | | | −6.6516E−06 | 1.8507E−07 | −3.2945E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from TABLE 7 and TABLE 8 as the following values and satisfy the following conditions:

| 4th Embodiment | | | |
|---|---|---|---|
| f (mm) | 4.20 | CT4/T34 | 0.63 |
| Fno | 2.02 | CT4/T45 | 0.71 |
| HFOV (deg.) | 37.5 | TL (mm) | 4.64 |
| V2 + V3 + V4 | 70.5 | $|f/R5| + |f/R6|$ | 0.37 |
| (V2 + V4)/V3 | 2.00 | $|R7/f|$ | 0.74 |
| V3 | 23.5 | $(|R7| + |R8| + |R9| + |R10|)/f$ | 2.26 |
| (CT2 + CT3 + CT4)/CT5 | 1.33 | R8/R9 | 1.18 |
| (T34 + T45)/ΣAT | 0.70 | $|f/f3| + |f/f4| + |f/f5|$ | 0.36 |

5th Embodiment

Figure 9:
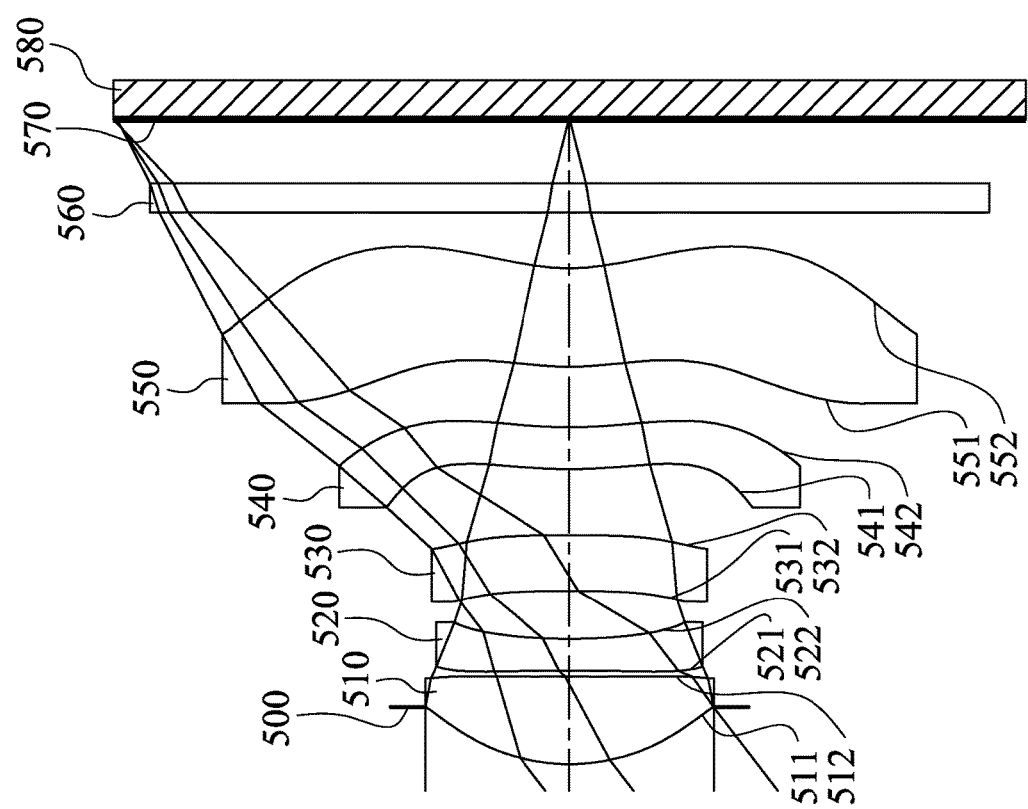
FIG. 9 is a schematic view of an image capturing apparatus according to the 5th embodiment of the present disclosure.
Figure 10:
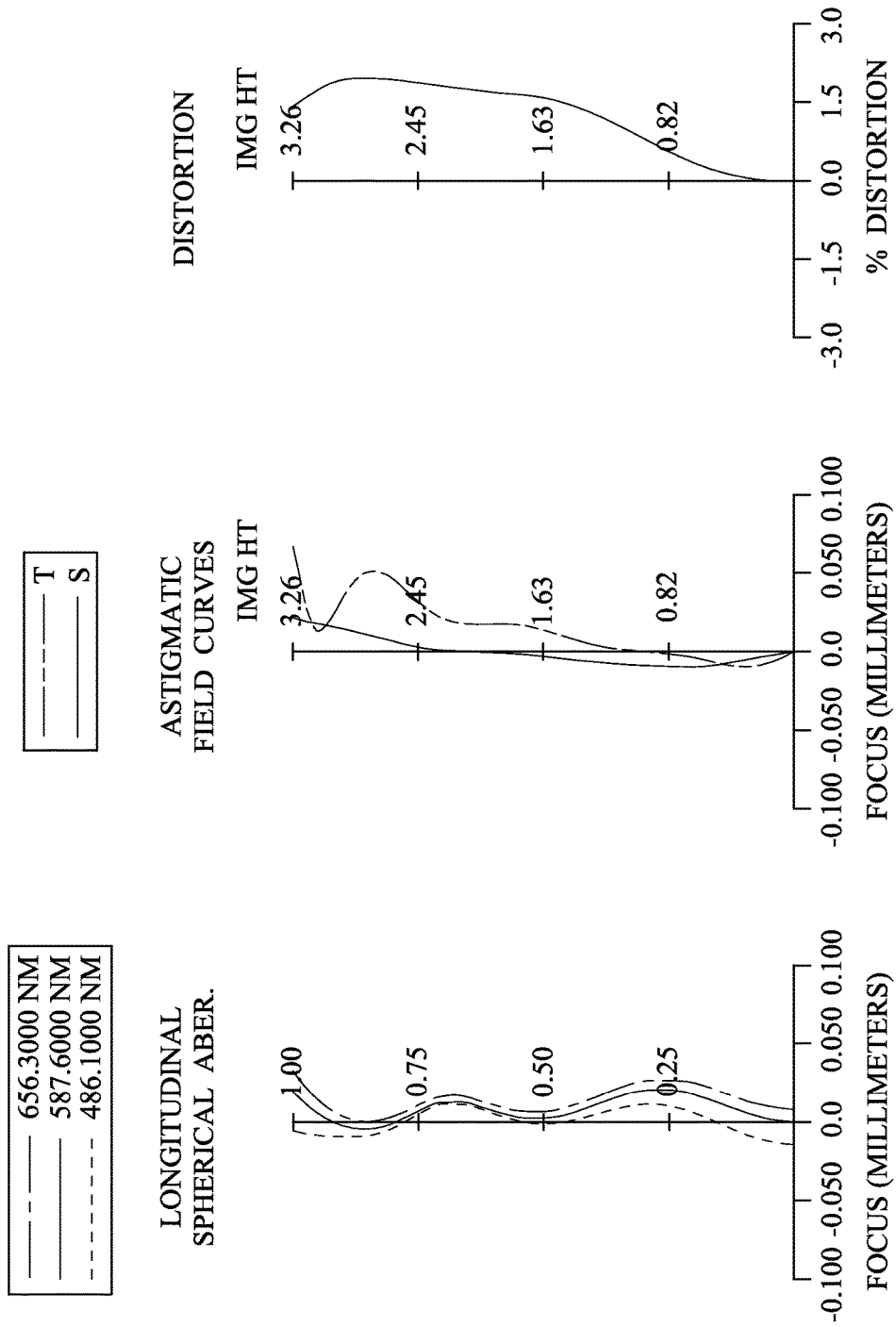
FIG. 10 shows spherical aberration curves, astigmatic field curves and a distortion curve of the image capturing apparatus according to the 5th embodiment.

FIG. 9 is a schematic view of an image capturing apparatus according to the 5th embodiment of the present disclosure. FIG. 10 shows, in order from left to right, spherical aberration curves, astigmatic field curves and a distortion curve of the image capturing apparatus according to the 5th embodiment.

In FIG. 9, the image capturing apparatus includes the imaging system (its reference numeral is omitted) and an image sensor 580. The imaging system includes, in order from an object side to an image side, an aperture stop 500, a first lens element 510, a second lens element 520, a third lens element 530, a fourth lens element 540, a fifth lens element 550, an IR-cut filter 560 and an image surface 570. The image sensor 580 is disposed on the image surface 570 of the imaging system. The imaging system has a total of five lens elements (510-550) with refractive power. Moreover, there is an air gap between any two of the first lens element 510, the second lens element 520, the third lens element 530, the fourth lens element 540 and the fifth lens element 550 that are adjacent to each other.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. Furthermore, the image-side surface 542 of the fourth lens element 540 includes at least one convex shape in an off-axis region thereof.

The fifth lens element 550 with negative refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric. Furthermore, the image-side surface 552 of the fifth lens element 550 includes at least one convex shape in an off-axis region thereof.

The IR-cut filter 560 is made of glass material and located between the fifth lens element 550 and the image surface 570, and will not affect the focal length of the imaging system.

Furthermore, in the imaging system of the image capturing apparatus according to the 5th embodiment, when a focal length of the first lens element 510 is f1, a focal length of the second lens element 520 is f2, a focal length of the third lens element 530 is f3, a focal length of the fourth lens element 540 is f4, and a focal length of the fifth lens element 550 is f5, the following conditions are satisfied: $|f3|>|f1|$, $|f3|>|f2|$, $|f3|>|f4|$, and $|f3|>|f5|$.

In the imaging system of the image capturing apparatus according to the 5th embodiment, when a central thickness of the first lens element 510 is CT1, a central thickness of the second lens element 520 is CT2, a central thickness of the third lens element 530 is CT3, a central thickness of the fourth lens element 540 is CT4, and a central thickness of the fifth lens element 550 is CT5, CT5 is larger than CT1, CT2, CT3, and CT4.

The detailed optical data of the 5th embodiment are shown in TABLE 9 and the aspheric surface data are shown in TABLE 10 below.

TABLE 9

5th Embodiment
f = 4.19 mm, Fno = 2.02, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.409 | | | | |
| 2 | Lens 1 | 1.422 | ASP | 0.628 | Plastic | 1.544 | 55.9 | 2.88 |
| 3 | | 12.785 | ASP | 0.042 | | | | |
| 4 | Lens 2 | 65.061 | ASP | 0.230 | Plastic | 1.639 | 23.5 | −6.56 |
| 5 | | 3.932 | ASP | 0.347 | | | | |
| 6 | Lens 3 | −19.301 | ASP | 0.402 | Plastic | 1.639 | 23.5 | −2152.23 |

TABLE 9-continued

5th Embodiment
f = 4.19 mm, Fno = 2.02, HFOV = 37.5 deg.

| Surface # | | Curvature Radius | | Thickness | Material | Index | Abbe # | Focal Length |
|---|---|---|---|---|---|---|---|---|
| 7 | | −19.735 | ASP | 0.474 | | | | |
| 8 | Lens 4 | 3.200 | ASP | 0.301 | Plastic | 1.639 | 23.5 | −37.23 |
| 9 | | 2.717 | ASP | 0.434 | | | | |
| 10 | Lens 5 | 2.082 | ASP | 0.713 | Plastic | 1.535 | 55.7 | −21.81 |
| 11 | | 1.556 | ASP | 0.400 | | | | |
| 12 | IR-cut filter | Plano | | 0.210 | Glass | 1.517 | 64.2 | — |
| 13 | | Plano | | 0.459 | | | | |
| 14 | Image | Plano | | — | | | | |

Note 1:
Reference wavelength is 587.6 nm (d-line).
Note 2:
Effective radius of Surface 7 is 0.990 mm.

TABLE 10

Aspheric Coefficients

| Surface # | 2 | 3 | 4 | 5 | 6 |
|---|---|---|---|---|---|
| k = | −4.3410E+00 | 8.9901E+01 | −2.0380E+01 | −3.2967E+01 | 3.4515E+01 |
| A4 = | 1.7063E−01 | −2.0149E−01 | −2.2908E−01 | −6.5327E−03 | −1.5939E−01 |
| A6 = | −1.6929E−03 | 3.8437E−01 | 6.3941E−01 | 2.7135E−01 | 6.4187E−02 |
| A8 = | −1.7319E−01 | −3.2421E−01 | −6.7740E−01 | −2.2748E−01 | −1.8357E−01 |
| A10 = | 2.6395E−01 | 9.8898E−02 | 3.7293E−01 | −3.1428E−02 | 4.5398E−01 |
| A12 = | −1.3905E−01 | −1.7931E−02 | −6.5920E−02 | 2.1420E−01 | −5.2698E−01 |
| A14 = | | | | | 2.9575E−01 |

| Surface # | 7 | 8 | 9 | 10 | 11 |
|---|---|---|---|---|---|
| k = | 5.3708E+01 | −9.0000E+01 | −8.9881E+01 | −2.4765E+01 | −7.6073E+00 |
| A4 = | −1.4997E−01 | 3.1097E−02 | 6.1132E−04 | −1.5404E−01 | −9.8884E−02 |
| A6 = | 1.0273E−01 | −1.7291E−01 | −7.3771E−02 | 3.4391E−02 | 4.2029E−02 |
| A8 = | −2.0582E−01 | 9.7627E−02 | 4.5126E−02 | 5.9047E−03 | −1.7838E−02 |
| A10 = | 3.6118E−01 | −2.8834E−02 | −2.2341E−02 | −3.2867E−03 | 5.2802E−03 |
| A12 = | −3.0273E−01 | −1.4635E−02 | 7.3166E−03 | 4.5032E−04 | −9.5575E−04 |
| A14 = | 1.2149E−01 | 8.2738E−03 | −8.2201E−04 | −1.7484E−05 | 9.3717E−05 |
| A16 = | | | −4.7331E−05 | −4.5361E−07 | −3.7484E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from TABLE 9 and TABLE 10 as the following values and satisfy the following conditions:

5th Embodiment

| | | | |
|---|---|---|---|
| f (mm) | 4.19 | CT4/T34 | 0.64 |
| Fno | 2.02 | CT4/T45 | 0.69 |
| HFOV (deg.) | 37.5 | TL (mm) | 4.64 |
| V2 + V3 + V4 | 70.5 | $|f/R5| + |f/R6|$ | 0.43 |
| (V2 + V4)/V3 | 2.00 | $|R7/f|$ | 0.76 |
| V3 | 23.5 | $(|R7| + |R8| + |R9| + |R10|)/f$ | 2.28 |
| (CT2 + CT3 + CT4)/CT5 | 1.31 | R8/R9 | 1.31 |
| (T34 + T45)/ΣAT | 0.70 | $|f/f3| + |f/f4| + |f/f5|$ | 0.31 |

6th Embodiment

Figure 11:
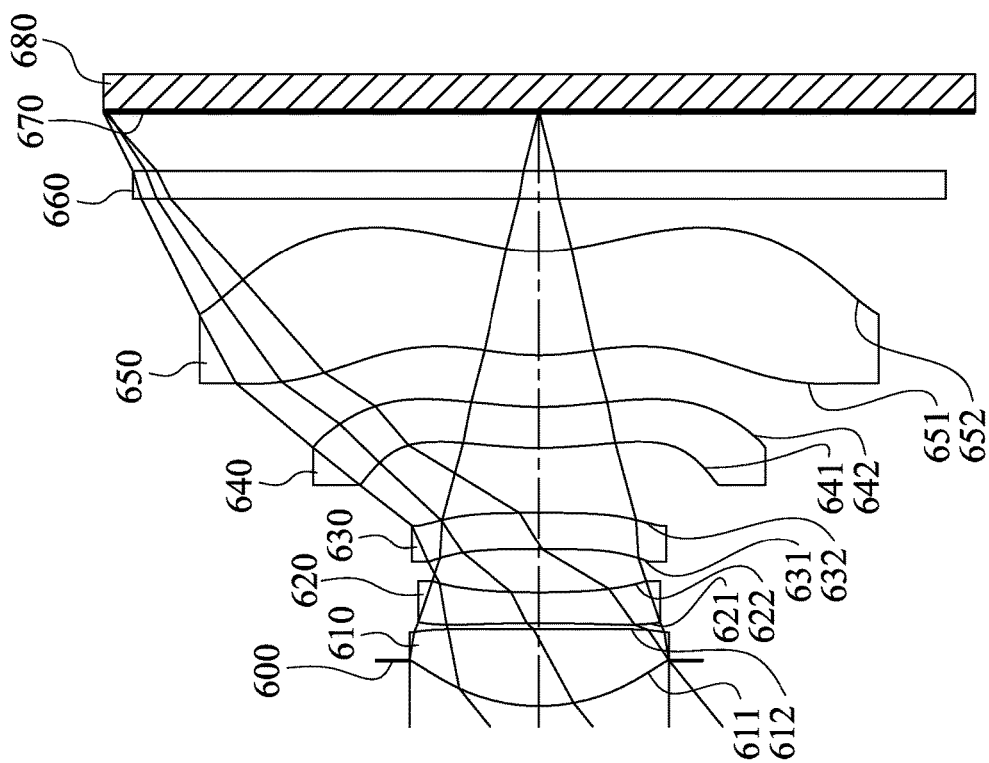
FIG. 11 is a schematic view of an image capturing apparatus according to the 6th embodiment of the present disclosure.
Figure 12:
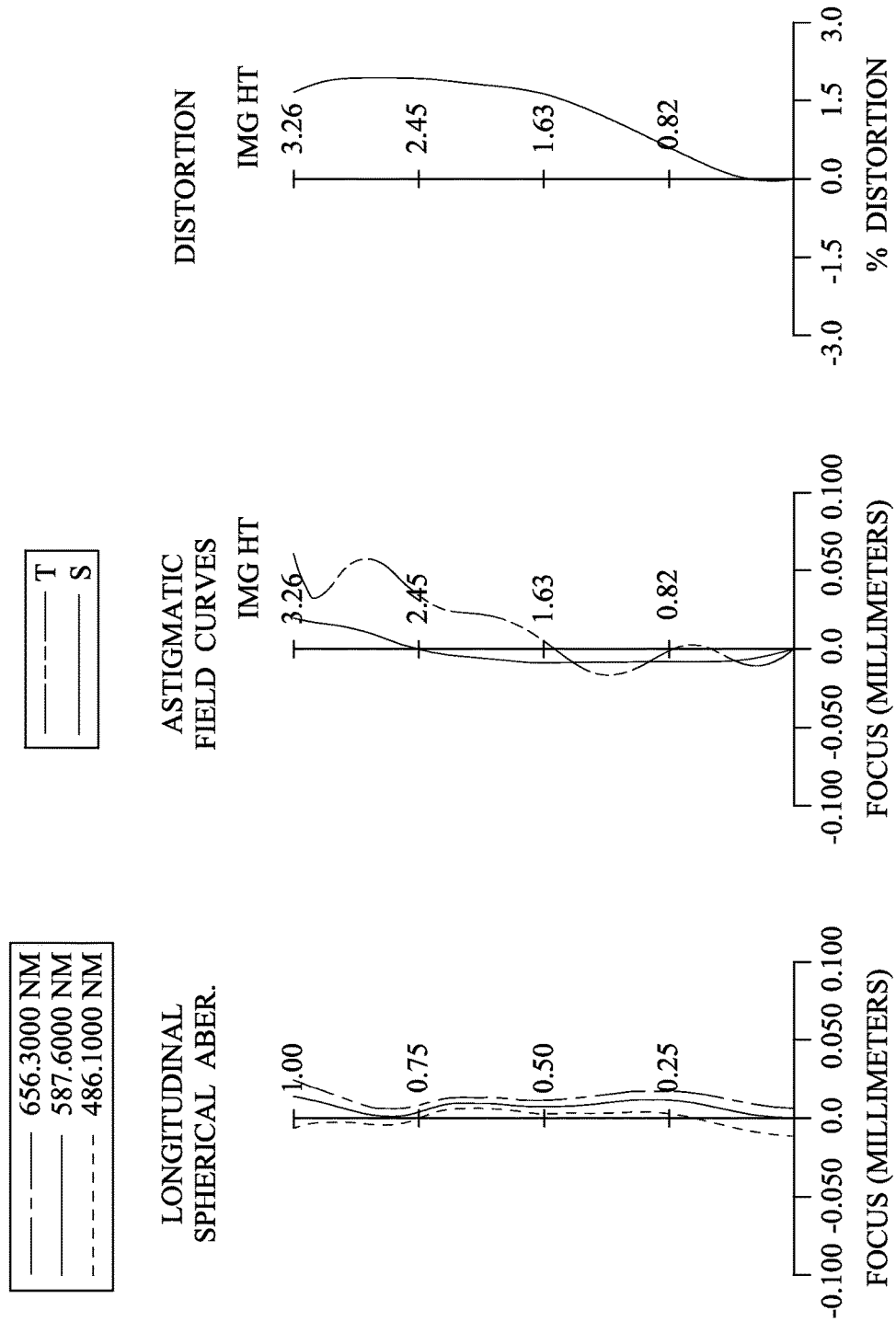
FIG. 12 shows spherical aberration curves, astigmatic field curves and a distortion curve of the image capturing apparatus according to the 6th embodiment.

FIG. 11 is a schematic view of an image capturing apparatus according to the 6th embodiment of the present disclosure. FIG. 12 shows, in order from left to right, spherical aberration curves, astigmatic field curves and a distortion curve of the image capturing apparatus according to the 6th embodiment.

In FIG. 11, the image capturing apparatus includes the imaging system (its reference numeral is omitted) and an image sensor 680. The imaging system includes, in order from an object side to an image side, an aperture stop 600, a first lens element 610, a second lens element 620, a third lens element 630, a fourth lens element 640, a fifth lens element 650, an IR-cut filter 660 and an image surface 670. The image sensor 680 is disposed on the image surface 670 of the imaging system. The imaging system has a total of five lens elements (610-650) with refractive power. Moreover, there is an air gap between any two of the first lens element 610, the second lens element 620, the third lens element 630, the fourth lens element 640 and the fifth lens element 650 that are adjacent to each other.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being concave in a paraxial region thereof and an image-side surface 622 being concave in a paraxial region thereof. The second lens element 620 is made of plastic material and has the object-side surface 621 and the image-side surface 622 being both aspheric.

The third lens element 630 with negative refractive power has an object-side surface 631 being concave in a paraxial region thereof and an image-side surface 632 being convex in a paraxial region thereof. The third lens element 630 is made of plastic material and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric. Furthermore, the image-side surface 642 of the fourth lens element 640 includes at least one convex shape in an off-axis region thereof.

The fifth lens element 650 with positive refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric. Furthermore, the image-side surface 652 of the fifth lens element 650 includes at least one convex shape in an off-axis region thereof.

The IR-cut filter 660 is made of glass material and located between the fifth lens element 650 and the image surface 670, and will not affect the focal length of the imaging system.

Furthermore, in the imaging system of the image capturing apparatus according to the 6th embodiment, when a focal length of the first lens element 610 is f1, a focal length of the second lens element 620 is f2, a focal length of the third lens element 630 is f3, a focal length of the fourth lens element 640 is f4, and a focal length of the fifth lens element 650 is f5, the following conditions are satisfied: |f3|>|f1|, |f3|>|f2|, |f3|>|f4|, and |f3|>|f5|.

In the imaging system of the image capturing apparatus according to the 6th embodiment, when a central thickness of the first lens element 610 is CT1, a central thickness of the second lens element 620 is CT2, a central thickness of the third lens element 630 is CT3, a central thickness of the fourth lens element 640 is CT4, and a central thickness of the fifth lens element 650 is CT5, CT5 is larger than CT1, CT2, CT3, and CT4.

The detailed optical data of the 6th embodiment are shown in TABLE 11 and the aspheric surface data are shown in TABLE 12 below.

TABLE 11

6th Embodiment
f = 3.95 mm, Fno = 2.02, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.346 | | | | |
| 2 | Lens 1 | 1.426 | ASP | 0.579 | Plastic | 1.544 | 55.9 | 2.85 |
| 3 | | 15.353 | ASP | 0.047 | | | | |
| 4 | Lens 2 | −19.744 | ASP | 0.230 | Plastic | 1.639 | 23.5 | −6.47 |
| 5 | | 5.253 | ASP | 0.328 | | | | |
| 6 | Lens 3 | −76.767 | ASP | 0.277 | Plastic | 1.639 | 23.5 | −3284.25 |
| 7 | | −79.794 | ASP | 0.490 | | | | |
| 8 | Lens 4 | 2.769 | ASP | 0.309 | Plastic | 1.639 | 23.5 | −18.36 |
| 9 | | 2.143 | ASP | 0.390 | | | | |
| 10 | Lens 5 | 1.678 | ASP | 0.784 | Plastic | 1.535 | 55.7 | 74.22 |
| 11 | | 1.467 | ASP | 0.400 | | | | |
| 12 | IR-cut filter | Plano | | 0.210 | Glass | 1.517 | 64.2 | — |
| 13 | | Plano | | 0.446 | | | | |
| 14 | Image | Plano | | — | | | | |

Note 1:
Reference wavelength is 587.6 nm (d-line).
Note 2:
Effective radius of Surface 7 is 0.960 mm.

TABLE 12

Aspheric Coefficients

| Surface # | 2 | 3 | 4 | 5 | 6 |
|---|---|---|---|---|---|
| k = | −5.3333E+00 | 8.9974E+01 | −2.0380E+01 | −4.7812E+01 | 3.6034E+01 |
| A4 = | 2.0990E−01 | −1.5946E−01 | −1.5129E−01 | −7.5717E−04 | −2.0766E−01 |
| A6 = | −9.1657E−02 | 2.7404E−01 | 5.0300E−01 | 2.5584E−01 | −1.2692E−01 |
| A8 = | −6.0971E−02 | −1.9011E−01 | −5.3516E−01 | −3.0336E−01 | 6.1528E−01 |
| A10 = | 1.8782E−01 | −2.4774E−02 | 2.7932E−01 | 1.1715E−01 | −1.3369E+00 |
| A12 = | −1.4150E−01 | 2.5520E−02 | −3.4423E−02 | 8.4389E−02 | 1.4429E+00 |
| A14 = | | | | | −4.7633E−01 |

| Surface # | 7 | 8 | 9 | 10 | 11 |
|---|---|---|---|---|---|
| k = | 5.3708E+01 | −8.6375E+01 | −6.3459E+01 | −1.4849E+01 | −5.5715E+00 |
| A4 = | −2.1495E−01 | 4.5197E−02 | −3.0688E−02 | −1.7798E−01 | −1.2090E−01 |

TABLE 12-continued

| Aspheric Coefficients | | | | |
|---|---|---|---|---|
| A6 = | 1.2685E−01 | −1.5434E−01 | 1.3038E−02 | 6.2494E−02 | 6.2092E−02 |
| A8 = | −2.8129E−01 | 5.9273E−02 | −5.1358E−02 | −1.0083E−02 | −2.6913E−02 |
| A10 = | 5.5123E−01 | 2.9224E−03 | 3.8419E−02 | 1.5161E−03 | 7.6184E−03 |
| A12 = | −5.1325E−01 | −2.7028E−02 | −1.5065E−02 | −3.4749E−04 | −1.3038E−03 |
| A14 = | 2.5566E−01 | 9.9601E−03 | 3.5363E−03 | 5.2432E−05 | 1.2102E−04 |
| A16 = | | | −3.8659E−04 | −2.9969E−06 | −4.6075E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from TABLE 11 and TABLE 12 as the following values and satisfy the following conditions:

| 6th Embodiment | | | |
|---|---|---|---|
| f (mm) | 3.95 | CT4/T34 | 0.63 |
| Fno | 2.02 | CT4/T45 | 0.79 |
| HFOV (deg.) | 39.0 | TL (mm) | 4.49 |
| V2 + V3 + V4 | 70.5 | \|f/R5\| + \|f/R6\| | 0.10 |
| (V2 + V4)/V3 | 2.00 | \|R7/f\| | 0.70 |
| V3 | 23.5 | (\|R7\| + \|R8\| + \|R9\| + \|R10\|)/f | 2.04 |
| (CT2 + CT3 + CT4)/CT5 | 1.04 | R8/R9 | 1.28 |
| (T34 + T45)/ΣAT | 0.70 | \|f/f3\| + \|f/f4\| + \|f/f5\| | 0.27 |

7th Embodiment

Figure 13:
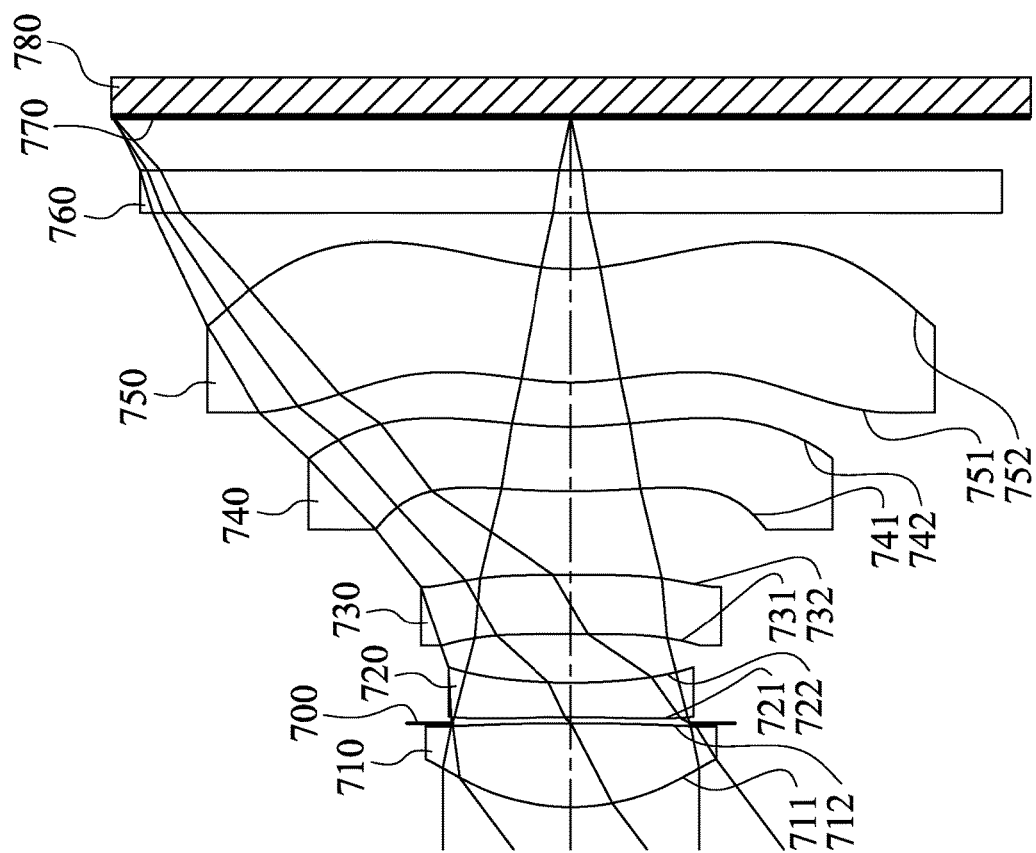
FIG. 13 is a schematic view of an image capturing apparatus according to the 7th embodiment of the present disclosure.
Figure 14:
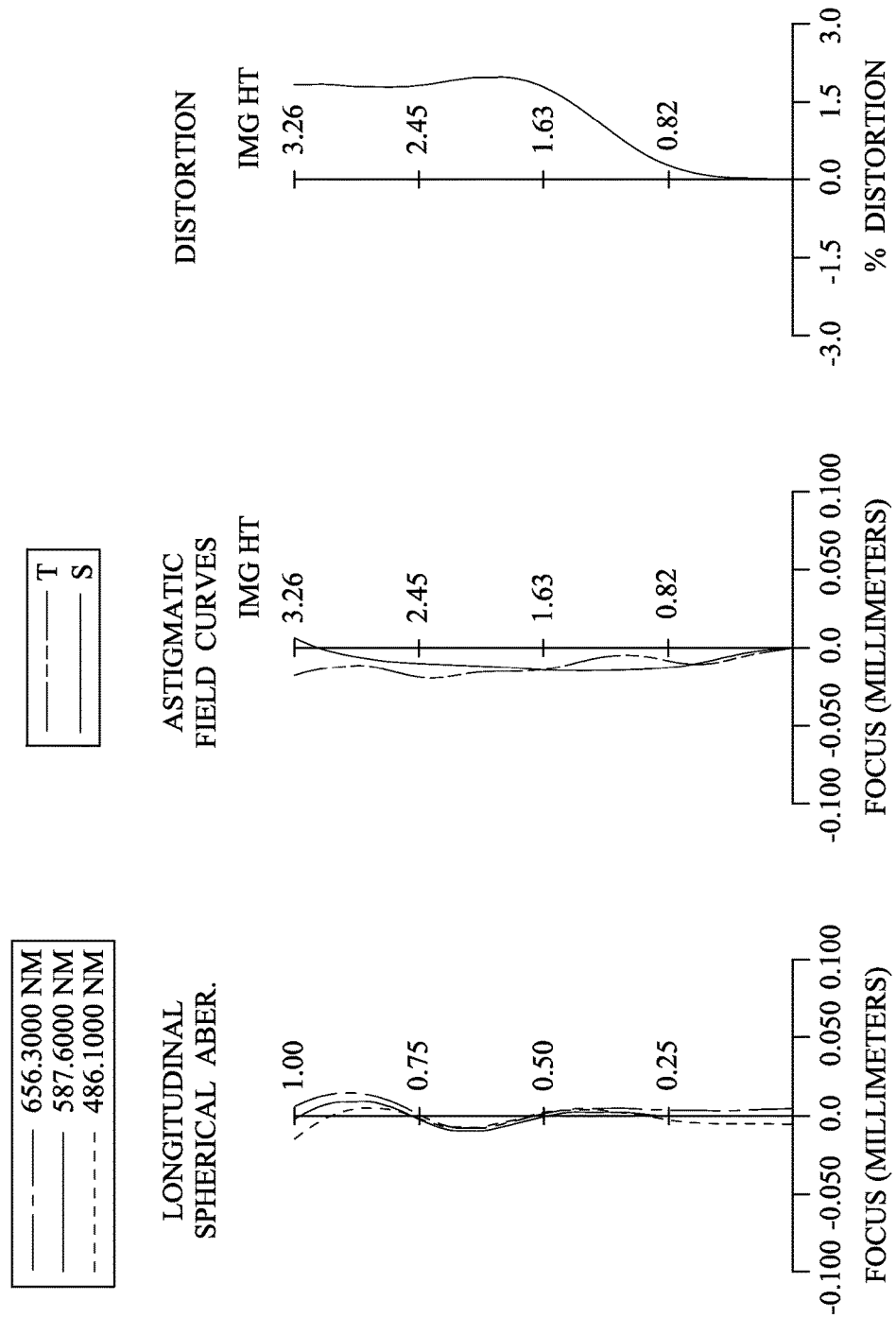
FIG. 14 shows spherical aberration curves, astigmatic field curves and a distortion curve of the image capturing apparatus according to the 7th embodiment.

FIG. 13 is a schematic view of an image capturing apparatus according to the 7th embodiment of the present disclosure. FIG. 14 shows, in order from left to right, spherical aberration curves, astigmatic field curves and a distortion curve of the image capturing apparatus according to the 7th embodiment.

In FIG. 13, the image capturing apparatus includes the imaging system (its reference numeral is omitted) and an image sensor 780. The imaging system includes, in order from an object side to an image side, a first lens element 710, an aperture stop 700, a second lens element 720, a third lens element 730, a fourth lens element 740, a fifth lens element 750, an IR-cut filter 760 and an image surface 770. The image sensor 780 is disposed on the image surface 770 of the imaging system. The imaging system has a total of five lens elements (710-750) with refractive power. Moreover, there is an air gap between any two of the first lens element 710, the second lens element 720, the third lens element 730, the fourth lens element 740 and the fifth lens element 750 that are adjacent to each other.

The first lens element 710 with positive refractive power has an object-side surface 711 being convex in a paraxial region thereof and an image-side surface 712 being convex in a paraxial region thereof. The first lens element 710 is made of plastic material and has the object-side surface 711 and the image-side surface 712 being both aspheric.

The second lens element 720 with negative refractive power has an object-side surface 721 being concave in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric.

The fourth lens element 740 with negative refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. Furthermore, the image-side surface 742 of the fourth lens element 740 includes at least one convex shape in an off-axis region thereof.

The fifth lens element 750 with positive refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. Furthermore, the image-side surface 752 of the fifth lens element 750 includes at least one convex shape in an off-axis region thereof.

The IR-cut filter 760 is made of glass material and located between the fifth lens element 750 and the image surface 770, and will not affect the focal length of the imaging system.

Furthermore, in the imaging system of the image capturing apparatus according to the 7th embodiment, when a central thickness of the first lens element 710 is CT1, a central thickness of the second lens element 720 is CT2, a central thickness of the third lens element 730 is CT3, a central thickness of the fourth lens element 740 is CT4, and a central thickness of the fifth lens element 750 is CT5, CT5 is larger than CT1, CT2, CT3, and CT4.

The detailed optical data of the 7th embodiment are shown in TABLE 13 and the aspheric surface data are shown in TABLE 14 below.

TABLE 13

7th Embodiment
f = 4.28 mm, Fno = 2.35, HFOV = 36.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.566 | ASP | 0.595 | Plastic | 1.544 | 55.9 | 2.83 |

TABLE 13-continued

7th Embodiment
f = 4.28 mm, Fno = 2.35, HFOV = 36.8 deg.

| Surface # | | Curvature Radius | | Thickness | Material | Index | Abbe # | Focal Length |
|---|---|---|---|---|---|---|---|---|
| 2 | | −90.733 | ASP | 0.002 | | | | |
| 3 | Ape. Stop | Plano | | 0.040 | | | | |
| 4 | Lens 2 | −114.780 | ASP | 0.245 | Plastic | 1.639 | 23.5 | −5.59 |
| 5 | | 3.692 | ASP | 0.347 | | | | |
| 6 | Lens 3 | 97.739 | ASP | 0.425 | Plastic | 1.639 | 23.5 | 34.77 |
| 7 | | −28.710 | ASP | 0.593 | | | | |
| 8 | Lens 4 | 5.042 | ASP | 0.458 | Plastic | 1.639 | 23.5 | −11.78 |
| 9 | | 2.913 | ASP | 0.314 | | | | |
| 10 | Lens 5 | 1.929 | ASP | 0.809 | Plastic | 1.544 | 55.9 | 191.52 |
| 11 | | 1.675 | ASP | 0.400 | | | | |
| 12 | IR-cut filter | Plano | | 0.300 | Glass | 1.517 | 64.2 | — |
| 13 | | Plano | | 0.381 | | | | |
| 14 | Image | Plano | | — | | | | |

Note:
Reference wavelength is 587.6 nm (d-line).

TABLE 14

| Aspheric Coefficients | | | | | |
|---|---|---|---|---|---|
| Surface # | 1 | 2 | 4 | 5 | 6 |
| k = | −3.3259E+00 | −9.0000E+01 | −9.0000E+01 | −3.2984E+01 | 8.9864E+01 |
| A4 = | 1.0545E−01 | −1.7243E−01 | −2.1888E−01 | −4.1211E−02 | −1.6732E−01 |
| A6 = | −5.2389E−02 | 4.1323E−01 | 6.2855E−01 | 3.9320E−01 | 1.5354E−01 |
| A8 = | 9.1540E−02 | −4.1649E−01 | −4.0350E−01 | −1.1232E+00 | −5.5628E−01 |
| A10 = | −1.8423E−01 | 3.0140E−01 | −7.7626E−01 | 2.8071E+00 | 1.4735E+00 |
| A12 = | 1.6136E−01 | −4.7460E−01 | 2.0824E+00 | −4.6165E+00 | −2.3056E+00 |
| A14 = | −5.1759E−02 | 5.7776E−01 | −1.9367E+00 | 4.1896E+00 | 2.0069E+00 |
| A16 = | −1.0472E−02 | −2.6979E−01 | 6.6968E−01 | −1.5715E+00 | −7.2635E−01 |
| Surface # | 7 | 8 | 9 | 10 | 11 |
| k = | −2.6176E+01 | −9.0000E+01 | −7.3862E+01 | −2.2539E+01 | −9.4754E+00 |
| A4 = | −1.2240E−01 | −3.5331E−02 | 7.8637E−04 | −8.2850E−02 | −4.4571E−02 |
| A6 = | 3.4599E−02 | 9.1346E−03 | −3.2783E−02 | 3.3239E−03 | 9.3277E−03 |
| A8 = | 2.7087E−02 | −1.0518E−01 | 8.1468E−03 | 7.1674E−03 | −3.2288E−03 |
| A10 = | −9.2145E−02 | 1.1676E−01 | 2.6828E−03 | −1.7762E−03 | 8.0066E−04 |
| A12 = | 1.4832E−01 | −6.5693E−02 | −2.3517E−03 | 1.3682E−03 | −1.2446E−04 |
| A14 = | −9.0621E−02 | 1.6391E−02 | 6.2468E−04 | 2.8413E−06 | 1.0987E−05 |
| A16 = | 2.6153E−02 | −1.1273E−03 | −5.9896E−05 | −6.4000E−07 | −4.0222E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from TABLE 13 and TABLE 14 as the following values and satisfy the following conditions:

| 7th Embodiment | | | |
|---|---|---|---|
| f (mm) | 4.28 | CT4/T34 | 0.77 |
| Fno | 2.35 | CT4/T45 | 1.46 |
| HFOV (deg.) | 36.8 | TL (mm) | 4.91 |
| V2 + V3 + V4 | 70.5 | |f/R5| + |f/R6| | 0.19 |
| (V2 + V4)/V3 | 2.00 | |R7/f| | 1.18 |
| V3 | 23.5 | (|R7| + |R8| + |R9| + |R10|)/f | 2.70 |
| (CT2 + CT3 + CT4)/CT5 | 1.39 | R8/R9 | 1.51 |
| (T34 + T45)/ΣAT | 0.70 | |f/f3| + |f/f4| + |f/f5| | 0.51 |

8th Embodiment

Figure 15:
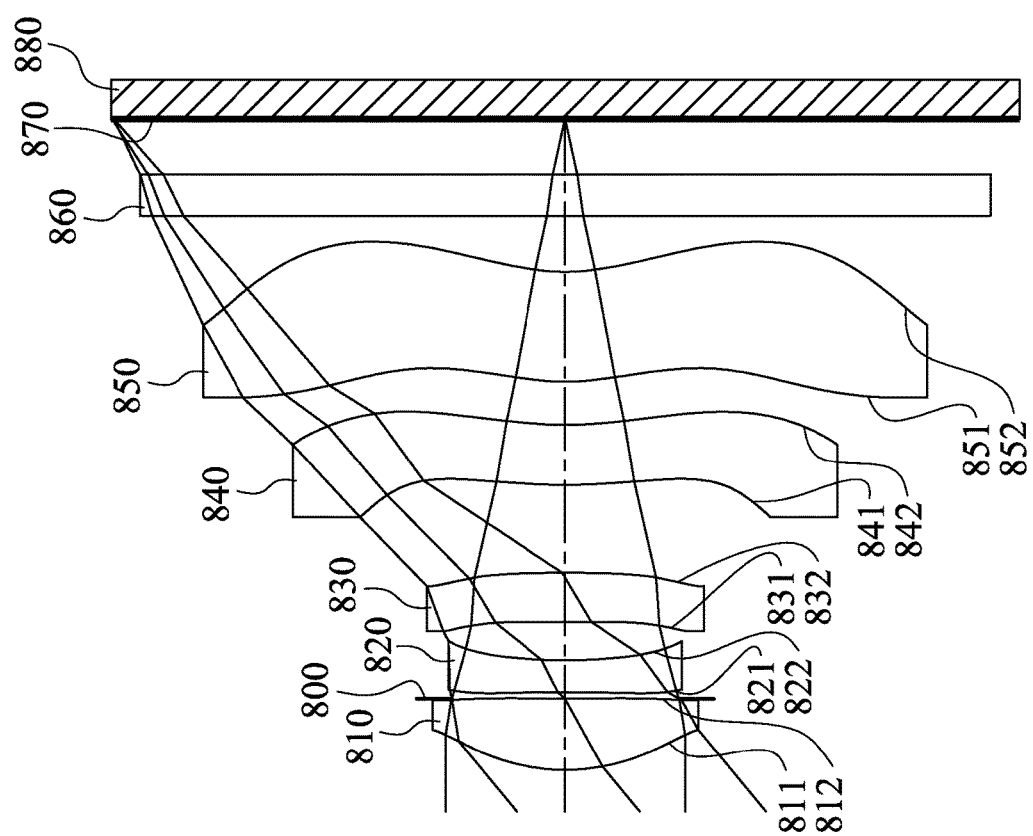
FIG. 15 is a schematic view of an image capturing apparatus according to the 8th embodiment of the present disclosure.
Figure 16:
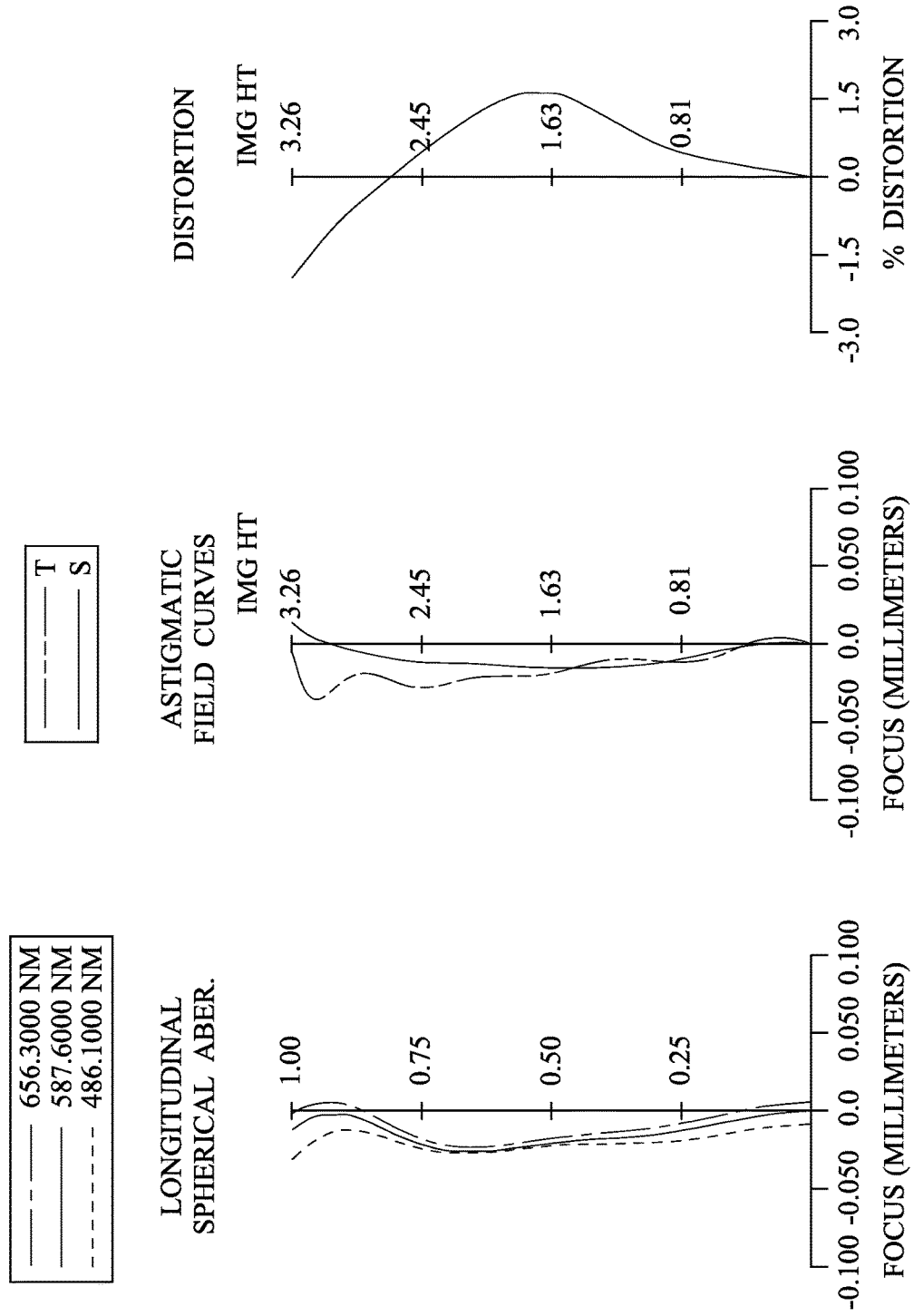
FIG. 16 shows spherical aberration curves, astigmatic field curves and a distortion curve of the image capturing apparatus according to the 8th embodiment.

FIG. 15 is a schematic view of an image capturing apparatus according to the 8th embodiment of the present disclosure. FIG. 16 shows, in order from left to right, spherical aberration curves, astigmatic field curves and a distortion curve of the image capturing apparatus according to the 8th embodiment.

In FIG. 15, the image capturing apparatus includes the imaging system (its reference numeral is omitted) and an image sensor 880. The imaging system includes, in order from an object side to an image side, a first lens element 810, an aperture stop 800, a second lens element 820, a third lens element 830, a fourth lens element 840, a fifth lens element 850, an IR-cut filter 860 and an image surface 870. The image sensor 880 is disposed on the image surface 870 of the imaging system. The imaging system has a total of five lens elements (810-850) with refractive power. Moreover, there is an air gap between any two of the first lens element 810, the second lens element 820, the third lens element 830, the fourth lens element 840 and the fifth lens element 850 that are adjacent to each other.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with negative refractive power has an object-side surface 821 being concave in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric.

The fourth lens element 840 with negative refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric. Furthermore, the image-side surface 842 of the fourth lens element 840 includes at least one convex shape in an off-axis region thereof.

The fifth lens element 850 with positive refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric. Furthermore, the image-side surface 852 of the fifth lens element 850 includes at least one convex shape in an off-axis region thereof.

The IR-cut filter 860 is made of glass material and located between the fifth lens element 850 and the image surface 870, and will not affect the focal length of the imaging system.

Furthermore, in the imaging system of the image capturing apparatus according to the 8th embodiment, when a central thickness of the first lens element 810 is CT1, a central thickness of the second lens element 820 is CT2, a central thickness of the third lens element 830 is CT3, a central thickness of the fourth lens element 840 is CT4, and a central thickness of the fifth lens element 850 is CT5, CT5 is larger than CT1, CT2, CT3, and CT4.

The detailed optical data of the 8th embodiment are shown in TABLE 15 and the aspheric surface data are shown in TABLE 16 below.

TABLE 15

8th Embodiment
f = 4.05 mm, Fno = 2.35, HFOV = 39.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.467 | ASP | 0.516 | Plastic | 1.544 | 55.9 | 2.92 |
| 2 | | 16.705 | ASP | −0.001 | | | | |
| 3 | Ape. Stop | Plano | | 0.046 | | | | |
| 4 | Lens 2 | −30.202 | ASP | 0.230 | Plastic | 1.639 | 23.5 | −5.35 |
| 5 | | 3.865 | ASP | 0.275 | | | | |
| 6 | Lens 3 | 21.016 | ASP | 0.353 | Plastic | 1.639 | 23.5 | 16.32 |
| 7 | | −20.570 | ASP | 0.634 | | | | |
| 8 | Lens 4 | 4.434 | ASP | 0.434 | Plastic | 1.639 | 23.5 | −10.32 |
| 9 | | 2.550 | ASP | 0.310 | | | | |
| 10 | Lens 5 | 1.616 | ASP | 0.790 | Plastic | 1.544 | 55.9 | 27.71 |
| 11 | | 1.499 | ASP | 0.400 | | | | |
| 12 | IR-cut filter | Plano | | 0.300 | Glass | 1.517 | 64.2 | — |
| 13 | | Plano | | 0.403 | | | | |
| 14 | Image | Plano | | — | | | | |

Note:
Reference wavelength is 587.6 nm (d-line).

TABLE 16

Aspheric Coefficients

| Surface # | 1 | 2 | 4 | 5 | 6 |
|---|---|---|---|---|---|
| k = | −2.7176E+00 | −9.0000E+01 | −9.0000E+01 | −3.0690E+01 | 9.0000E+01 |
| A4 = | 1.0448E−01 | −1.8731E−01 | −1.7331E−01 | −3.9935E−03 | −1.9372E−01 |
| A6 = | −5.7505E−02 | 4.0362E−01 | 6.3574E−01 | 4.6459E−01 | 1.0723E−01 |
| A8 = | 8.3519E−02 | −4.2358E−01 | −4.0759E−01 | −1.2196E+00 | −3.7569E−01 |
| A10 = | −1.9767E−01 | 2.9514E−01 | −7.7476E−01 | 3.0670E+00 | 9.6879E−01 |
| A12 = | 1.4725E−01 | −4.8274E−01 | 2.1229E+00 | −5.4701E+00 | −1.6133E+00 |
| A14 = | −6.2689E−02 | 5.6560E−01 | −1.9259E+00 | 5.6807E+00 | 1.5718E+00 |
| A16 = | −1.6835E−02 | −2.8763E−01 | 6.0436E−01 | −2.4295E+00 | −5.3975E−01 |

| Surface # | 7 | 8 | 9 | 10 | 11 |
|---|---|---|---|---|---|
| k = | −2.6176E+01 | −3.0443E+01 | −5.9043E+01 | −1.7769E+01 | −8.5133E+00 |
| A4 = | −1.3359E−01 | −3.4965E−02 | 3.4456E−02 | −7.7629E−02 | −4.4041E−02 |
| A6 = | −1.0344E−02 | 2.5686E−02 | −5.9695E−02 | 3.0829E−03 | 9.0785E−03 |
| A8 = | 1.5628E−01 | −1.1966E−01 | 2.9831E−02 | 7.0914E−03 | −3.2398E−03 |

TABLE 16-continued

| Aspheric Coefficients | | | | | |
|---|---|---|---|---|---|
| A10 = | −4.2840E−01 | 1.3477E−01 | −1.0620E−02 | −1.7832E−03 | 8.0156E−04 |
| A12 = | 6.8465E−01 | −8.4816E−02 | 2.7247E−03 | 1.3672E−04 | −1.2422E−04 |
| A14 = | −5.2614E−01 | 2.7249E−02 | −4.0503E−04 | 2.9414E−06 | 1.1017E−05 |
| A16 = | 1.8792E−01 | −3.3318E−03 | 2.4167E−05 | −6.0969E−07 | −4.0003E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from TABLE 15 and TABLE 16 as the following values and satisfy the following conditions:

| 8th Embodiment | | | |
|---|---|---|---|
| f (mm) | 4.05 | CT4/T34 | 0.68 |
| Fno | 2.35 | CT4/T45 | 1.40 |
| HFOV (deg.) | 39.5 | TL (mm) | 4.69 |
| V2 + V3 + V4 | 70.5 | |f/R5| + |f/R6| | 0.39 |
| (V2 + V4)/V3 | 2.00 | |R7/f| | 1.09 |
| V3 | 23.5 | (|R7| + |R8| + |R9| + |R10|)/f | 2.49 |
| (CT2 + CT3 + CT4)/CT5 | 1.29 | R8/R9 | 1.58 |
| (T34 + T45)/ΣAT | 0.75 | |f/f3| + |f/f4| + |f/f5| | 0.79 |

9th Embodiment

Figure 17:
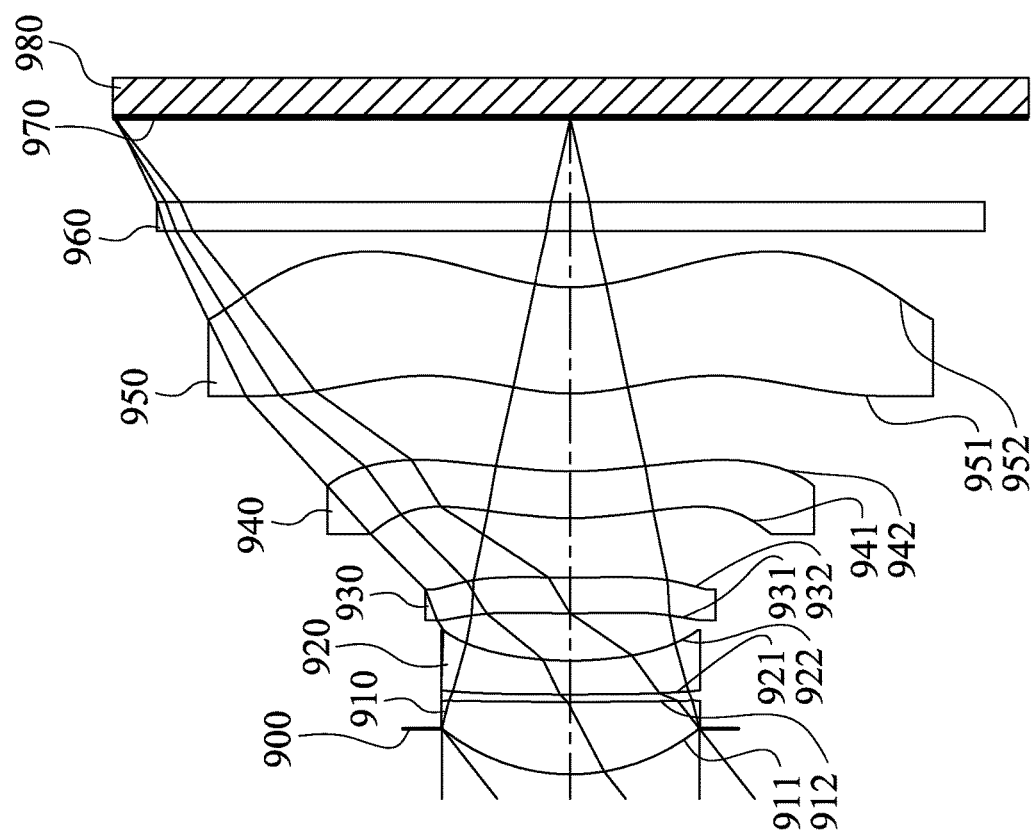
FIG. 17 is a schematic view of an image capturing apparatus according to the 9th embodiment of the present disclosure.
Figure 18:
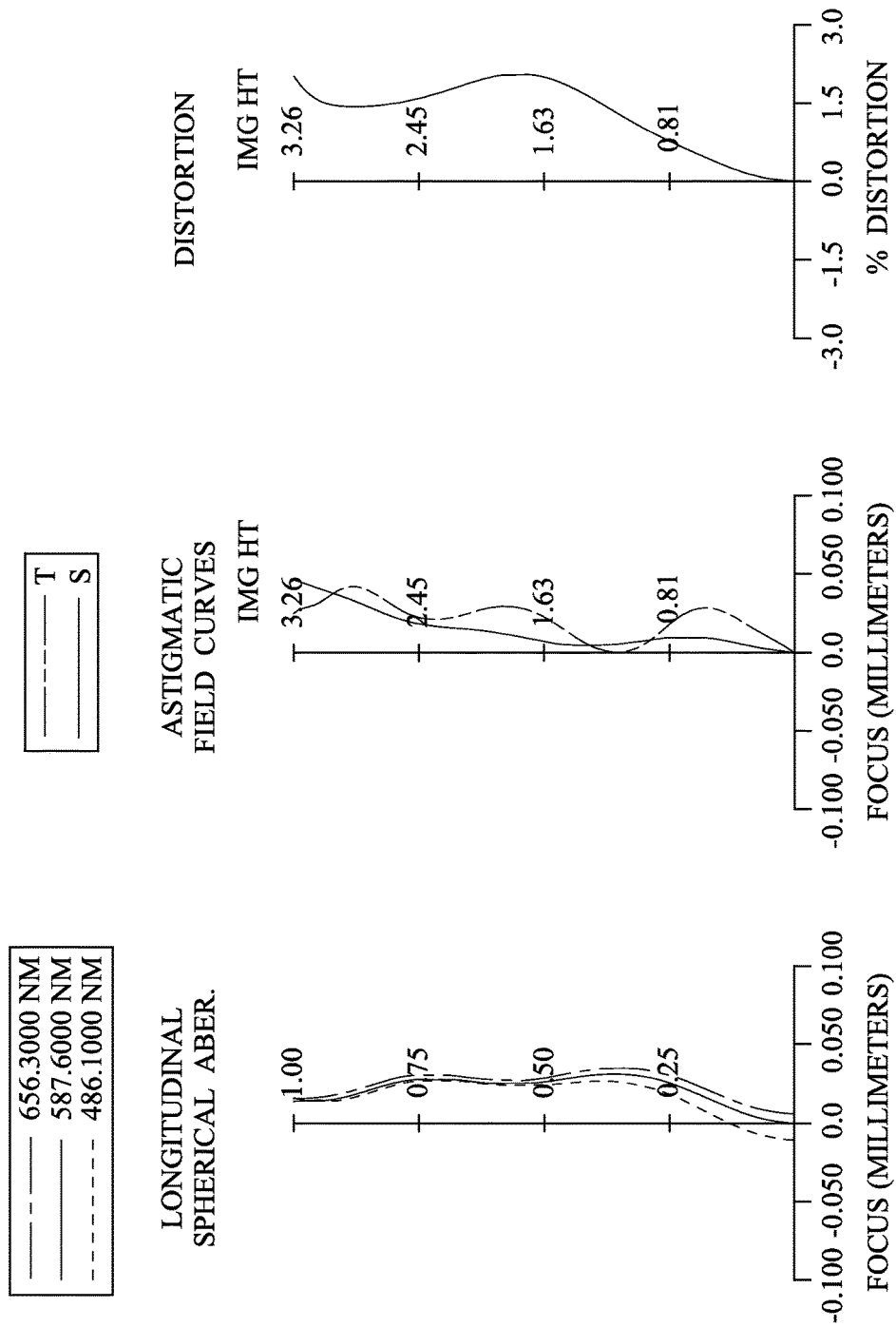
FIG. 18 shows spherical aberration curves, astigmatic field curves and a distortion curve of the image capturing apparatus according to the 9th embodiment.

FIG. 17 is a schematic view of an image capturing apparatus according to the 9th embodiment of the present disclosure. FIG. 18 shows, in order from left to right, spherical aberration curves, astigmatic field curves and a distortion curve of the image capturing apparatus according to the 9th embodiment.

In FIG. 17, the image capturing apparatus includes the imaging system (its reference numeral is omitted) and an image sensor 980. The imaging system includes, in order from an object side to an image side, an aperture stop 900, a first lens element 910, a second lens element 920, a third lens element 930, a fourth lens element 940, a fifth lens element 950, an IR-cut filter 960 and an image surface 970. The image sensor 980 is disposed on the image surface 970 of the imaging system. The imaging system has a total of five lens elements (910-950) with refractive power. Moreover, there is an air gap between any two of the first lens element 910, the second lens element 920, the third lens element 930, the fourth lens element 940 and the fifth lens element 950 that are adjacent to each other.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with positive refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric.

The fourth lens element 940 with positive refractive power has an object-side surface 941 being convex in a paraxial region thereof and an image-side surface 942 being concave in a paraxial region thereof. The fourth lens element 940 is made of plastic material and has the object-side surface 941 and the image-side surface 942 being both aspheric. Furthermore, the image-side surface 942 of the fourth lens element 940 includes at least one convex shape in an off-axis region thereof.

The fifth lens element 950 with positive refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric. Furthermore, the image-side surface 952 of the fifth lens element 950 includes at least one convex shape in an off-axis region thereof.

The IR-cut filter 960 is made of glass material and located between the fifth lens element 950 and the image surface 970, and will not affect the focal length of the imaging system.

Furthermore, in the imaging system of the image capturing apparatus according to the 9th embodiment, when a focal length of the first lens element 910 is f1, a focal length of the second lens element 920 is f2, a focal length of the third lens element 930 is f3, a focal length of the fourth lens element 940 is f4, and a focal length of the fifth lens element 950 is f5, the following conditions are satisfied: |f3|>|f1|, |f3|>|f2|, |f3|>|f4|, and |f3|>|f5|.

In the imaging system of the image capturing apparatus according to the 9th embodiment, when a central thickness of the first lens element 910 is CT1, a central thickness of the second lens element 920 is CT2, a central thickness of the third lens element 930 is CT3, a central thickness of the fourth lens element 940 is CT4, and a central thickness of the fifth lens element 950 is CT5, CT5 is larger than CT1, CT2, CT3, and CT4.

The detailed optical data of the 9th embodiment are shown in TABLE 17 and the aspheric surface data are shown in TABLE 18 below.

TABLE 17

9th Embodiment
f = 4.04 mm, Fno = 2.20, HFOV = 38.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.327 | | | | |
| 2 | Lens 1 | 1.452 | ASP | 0.515 | Plastic | 1.535 | 55.7 | 3.05 |
| 3 | | 11.605 | ASP | 0.054 | | | | |
| 4 | Lens 2 | 9.560 | ASP | 0.240 | Plastic | 1.639 | 23.5 | −5.06 |
| 5 | | 2.391 | ASP | 0.339 | | | | |
| 6 | Lens 3 | 7.860 | ASP | 0.260 | Plastic | 1.607 | 26.6 | 96.01 |
| 7 | | 8.970 | ASP | 0.424 | | | | |
| 8 | Lens 4 | 2.422 | ASP | 0.332 | Plastic | 1.583 | 30.2 | 65.97 |
| 9 | | 2.454 | ASP | 0.555 | | | | |
| 10 | Lens 5 | 1.567 | ASP | 0.762 | Plastic | 1.514 | 56.8 | 38.44 |
| 11 | | 1.421 | ASP | 0.400 | | | | |
| 12 | IR-cut filter | Plano | | 0.210 | Glass | 1.517 | 64.2 | — |
| 13 | | Plano | | 0.601 | | | | |
| 14 | Image | Plano | | — | | | | |

Note:
Reference wavelength is 587.6 nm (d-line).

TABLE 18

Aspheric Coefficients

| Surface # | 2 | 3 | 4 | 5 | 6 |
|---|---|---|---|---|---|
| k = | −3.1911E+00 | 9.0000E+01 | 1.5426E+01 | −1.4164E+01 | 2.2746E+01 |
| A4 = | 1.2148E−01 | −1.9127E−01 | −2.6066E−01 | −1.4643E−03 | −2.6357E−01 |
| A6 = | 3.8839E−02 | 4.0471E−01 | 7.0067E−01 | 4.6136E−01 | 4.6096E−01 |
| A8 = | −1.9616E−01 | −3.3644E−01 | −7.8040E−01 | −1.2949E+00 | −1.7920E+00 |
| A10 = | 2.9560E−01 | 6.0338E−02 | 5.3976E−01 | 3.3250E+00 | 4.6139E+00 |
| A12 = | −1.5274E−01 | 1.4423E−02 | −5.0192E−01 | −5.6068E+00 | −6.8958E+00 |
| A14 = | 2.4472E−03 | 7.4058E−03 | 4.3887E−01 | 5.0607E+00 | 5.5061E+00 |
| A16 = | −3.0268E−03 | −1.6242E−02 | −1.5310E−01 | −1.8012E+00 | −1.7519E+00 |

| Surface # | 7 | 8 | 9 | 10 | 11 |
|---|---|---|---|---|---|
| k = | −8.9680E+01 | −5.6522E+01 | −5.6903E+01 | −9.3170E+00 | −5.4248E+00 |
| A4 = | −2.7532E−01 | 7.6743E−02 | −4.5528E−02 | −9.1950E−02 | −5.9617E−02 |
| A6 = | 5.2607E−01 | −1.6757E−01 | 1.1855E−01 | 3.8924E−03 | 1.3412E−02 |
| A8 = | −1.5836E+00 | 1.6565E−01 | −1.5783E−01 | 1.1789E−02 | −3.2822E−03 |
| A10 = | 2.9676E+00 | −1.6726E−01 | 9.3850E−02 | −4.2375E−03 | 5.2692E−04 |
| A12 = | −3.2121E+00 | 9.9890E−02 | −2.9134E−02 | 6.8265E−04 | −4.2249E−05 |
| A14 = | 1.8714E+00 | −3.0189E−02 | 4.6521E−03 | −5.5525E−05 | 7.1991E−07 |
| A16 = | −4.2724E−01 | 3.7226E−03 | −3.1116E−04 | 1.8696E−06 | 8.4716E−08 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from TABLE 17 and TABLE 18 as the following values and satisfy the following conditions:

| 9th Embodiment | | | |
|---|---|---|---|
| f (mm) | 4.04 | CT4/T34 | 0.78 |
| Fno | 2.20 | CT4/T45 | 0.60 |
| HFOV (deg.) | 38.2 | TL (mm) | 4.69 |
| V2 + V3 + V4 | 80.3 | |f/R5| + |f/R6| | 0.96 |
| (V2 + V4)/V3 | 2.02 | |R7/f| | 0.60 |
| V3 | 26.6 | (|R7| + |R8| + |R9| + |R10|)/f | 1.95 |
| (CT2 + CT3 + CT4)/CT5 | 1.09 | R8/R9 | 1.57 |
| (T34 + T45)/ΣAT | 0.71 | |f/f3| + |f/f4| + |f/f5| | 0.21 |

10th Embodiment

Figure 19:
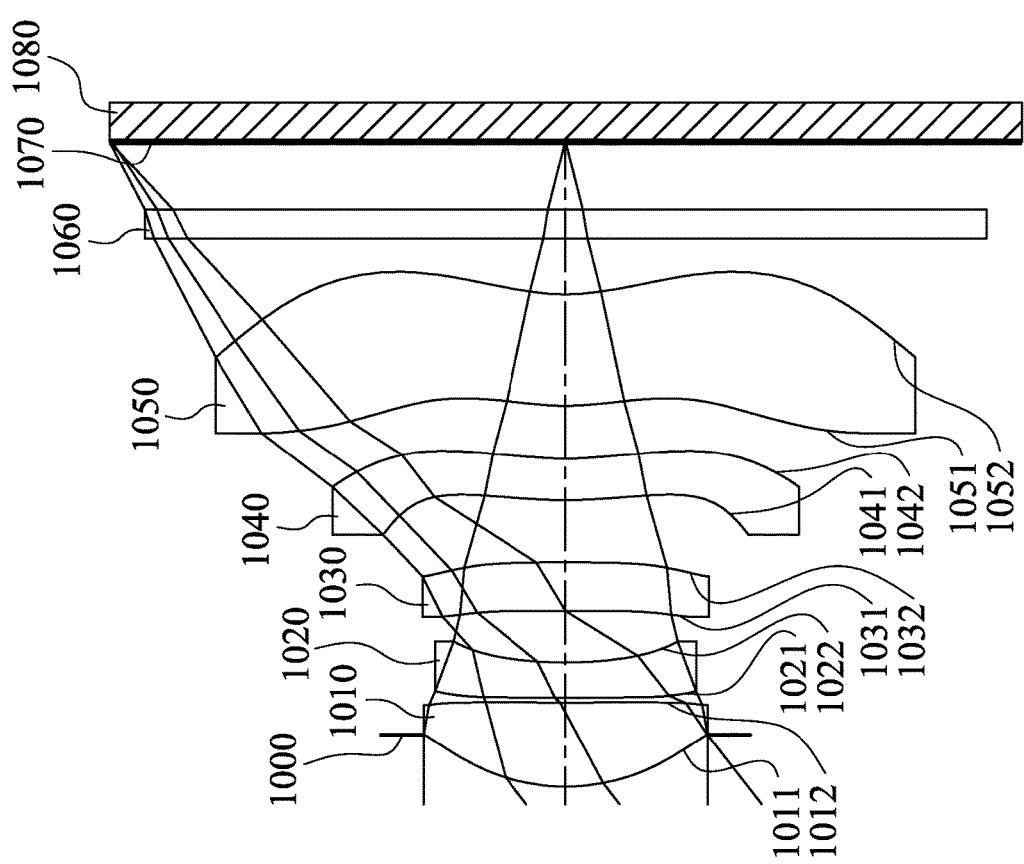
FIG. 19 is a schematic view of an image capturing apparatus according to the 10th embodiment of the present disclosure.
Figure 20:
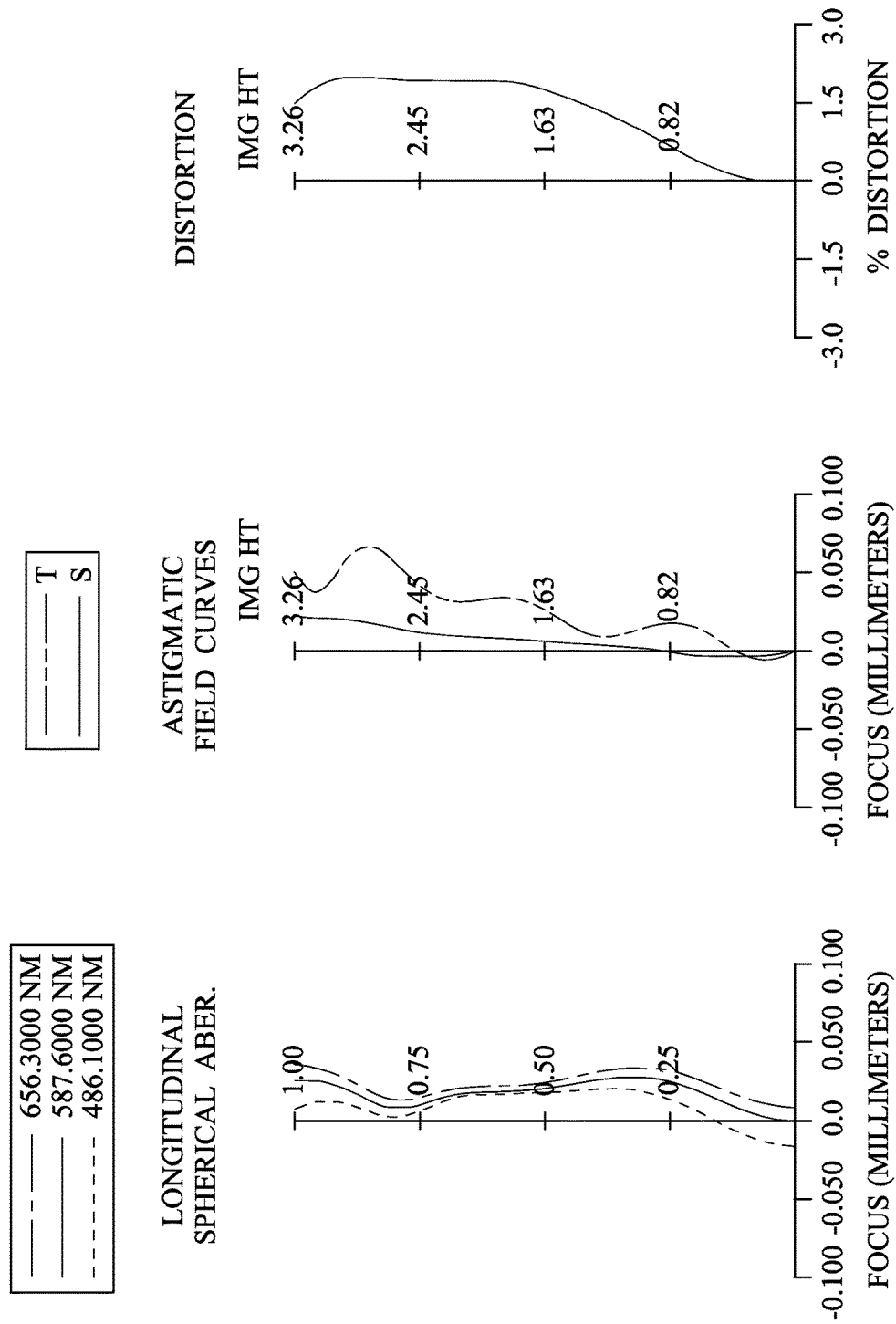
FIG. 20 shows spherical aberration curves, astigmatic field curves and a distortion curve of the image capturing apparatus according to the 10th embodiment.

FIG. 19 is a schematic view of an image capturing apparatus according to the 10th embodiment of the present disclosure. FIG. 20 shows, in order from left to right, spherical aberration curves, astigmatic field curves and a distortion curve of the image capturing apparatus according to the 10th embodiment.

In FIG. 19, the image capturing apparatus includes the imaging system (its reference numeral is omitted) and an image sensor 1080. The imaging system includes, in order from an object side to an image side, an aperture stop 1000, a first lens element 1010, a second lens element 1020, a third lens element 1030, a fourth lens element 1040, a fifth lens element 1050, an IR-cut filter 1060 and an image surface 1070. The image sensor 180 is disposed on the image surface 1070 of the imaging system. The imaging system has a total of five lens elements (1010-1050) with refractive power. Moreover, there is an air gap between any two of the first lens element 1010, the second lens element 1020, the third lens element 1030, the fourth lens element 1040 and the fifth lens element 1050 that are adjacent to each other.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric.

The second lens element 1020 with negative refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with positive refractive power has an object-side surface 1031 being convex in a paraxial region thereof and an image-side surface 1032 being convex in a paraxial region thereof. The third lens element 1030 is made of plastic material and has the object-side surface 1031 and the image-side surface 1032 being both aspheric.

The fourth lens element 1040 with negative refractive power has an object-side surface 1041 being convex in a paraxial region thereof and an image-side surface 1042 being concave in a paraxial region thereof. The fourth lens element 1040 is made of plastic material and has the object-side surface 1041 and the image-side surface 1042 being both aspheric. Furthermore, the image-side surface 1042 of the fourth lens element 1040 includes at least one convex shape in an off-axis region thereof.

The fifth lens element 1050 with negative refractive power has an object-side surface 1051 being convex in a paraxial region thereof and an image-side surface 1052 being concave in a paraxial region thereof. The fifth lens element 1050 is made of plastic material and has the object-side surface 1051 and the image-side surface 1052 being both aspheric. Furthermore, the image-side surface 1052 of the fifth lens element 1050 includes at least one convex shape in an off-axis region thereof.

The IR-cut filter 1060 is made of glass material and located between the fifth lens element 1050 and the image surface 1070, and will not affect the focal length of the imaging system.

Furthermore, in the imaging system of the image capturing apparatus according to the 10th embodiment, when a central thickness of the first lens element 1010 is CT1, a central thickness of the second lens element 1020 is CT2, a central thickness of the third lens element 1030 is CT3, a central thickness of the fourth lens element 1040 is CT4, and a central thickness of the fifth lens element 1050 is CT5, CT5 is larger than CT1, CT2, CT3, and CT4.

The detailed optical data of the 10th embodiment are shown in TABLE 19 and the aspheric surface data are shown in TABLE 20 below.

TABLE 19

10th Embodiment
f = 4.12 mm, Fno = 2.02, HFOV = 37.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.374 | | | | |
| 2 | Lens 1 | 1.440 | ASP | 0.606 | Plastic | 1.544 | 55.9 | 3.03 |
| 3 | | 9.742 | ASP | 0.035 | | | | |
| 4 | Lens 2 | 10.675 | ASP | 0.254 | Plastic | 1.639 | 23.5 | −6.38 |
| 5 | | 2.922 | ASP | 0.371 | | | | |
| 6 | Lens 3 | 47.774 | ASP | 0.349 | Plastic | 1.639 | 23.5 | 38.90 |
| 7 | | −51.679 | ASP | 0.447 | | | | |
| 8 | Lens 4 | 3.068 | ASP | 0.300 | Plastic | 1.639 | 23.5 | −19.13 |
| 9 | | 2.359 | ASP | 0.381 | | | | |
| 10 | Lens 5 | 1.960 | ASP | 0.802 | Plastic | 1.535 | 55.7 | −187.10 |
| 11 | | 1.648 | ASP | 0.400 | | | | |
| 12 | IR-cut filter | Plano | | 0.210 | Glass | 1.517 | 64.2 | — |
| 13 | | Plano | | 0.489 | | | | |
| 14 | Image | Plano | | — | | | | |

Note 1:
Reference wavelength is 587.6 nm (d-line).
Note 2:
Effective radius of Surface 7 is 1.030 mm.

TABLE 20

| Aspheric Coefficients | | | | | |
|---|---|---|---|---|---|
| Surface # | 2 | 3 | 4 | 5 | 6 |
| k = | −3.9637E+00 | −4.0773E+01 | −9.0000E+01 | −8.1984E+00 | 9.0000E+01 |
| A4 = | 1.4445E−01 | −2.4003E−01 | −2.3866E−01 | 2.6847E−03 | −1.2383E−01 |
| A6 = | 1.7143E−02 | 4.3206E−01 | 5.6981E−01 | 2.8728E−01 | 2.3562E−02 |
| A8 = | −1.9236E−01 | −2.5951E−01 | −3.4169E−01 | −2.7760E−01 | 8.3624E−02 |
| A10 = | 2.5762E−01 | −5.8016E−02 | −6.5144E−02 | 2.2817E−01 | −2.2683E−01 |
| A12 = | −1.3296E−01 | 5.5852E−02 | 1.0363E−01 | −4.9720E−02 | 3.0188E−01 |
| A14 = | | | | | −1.0878E−01 |

TABLE 20-continued

| Aspheric Coefficients | | | | | |
|---|---|---|---|---|---|
| Surface # | 7 | 8 | 9 | 10 | 11 |
| k = | 9.0000E+01 | −9.0000E+01 | −6.1488E+00 | −1.6210E+01 | −5.9694E+00 |
| A4 = | −1.3961E−01 | 5.3575E−03 | −5.7094E−02 | −1.9193E−01 | −1.1218E−01 |
| A6 = | 5.9318E−02 | −8.4418E−02 | 4.2169E−02 | 7.3749E−02 | 4.9904E−02 |
| A8 = | −6.5968E−02 | 4.8769E−03 | −4.0776E−02 | −8.5671E−03 | −1.8098E−02 |
| A10 = | 7.5868E−02 | 3.3853E−02 | 1.0251E−02 | −1.2736E−03 | 4.2563E−03 |
| A12 = | −4.5481E−02 | −4.2129E−02 | 2.2066E−03 | 4.8807E−04 | −6.1120E−04 |
| A14 = | 2.7783E−02 | 1.3411E−02 | −1.2266E−03 | −5.3467E−05 | 4.8991E−05 |
| A16 = | | | 1.2529E−04 | 2.0729E−06 | −1.6637E−06 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from TABLE 19 and TABLE 20 as the following values and satisfy the following conditions:

| 10th Embodiment | | | |
|---|---|---|---|
| f (mm) | 4.12 | CT4/T34 | 0.67 |
| Fno | 2.02 | CT4/T45 | 0.79 |
| HFOV (deg.) | 37.8 | TL (mm) | 4.64 |
| V2 + V3 + V4 | 70.5 | $|f/R5| + |f/R6|$ | 0.17 |
| (V2 + V4)/V3 | 2.00 | $|R7/f|$ | 0.74 |
| V3 | 23.5 | $(|R7| + |R8| + |R9| + |R10|)/f$ | 2.19 |
| (CT2 + CT3 + CT4)/CT5 | 1.13 | R8/R9 | 1.20 |
| (T34 + T45)/ΣAT | 0.67 | $|f/f3| + |f/f4| + |f/f5|$ | 0.34 |

11th Embodiment

Figure 21:
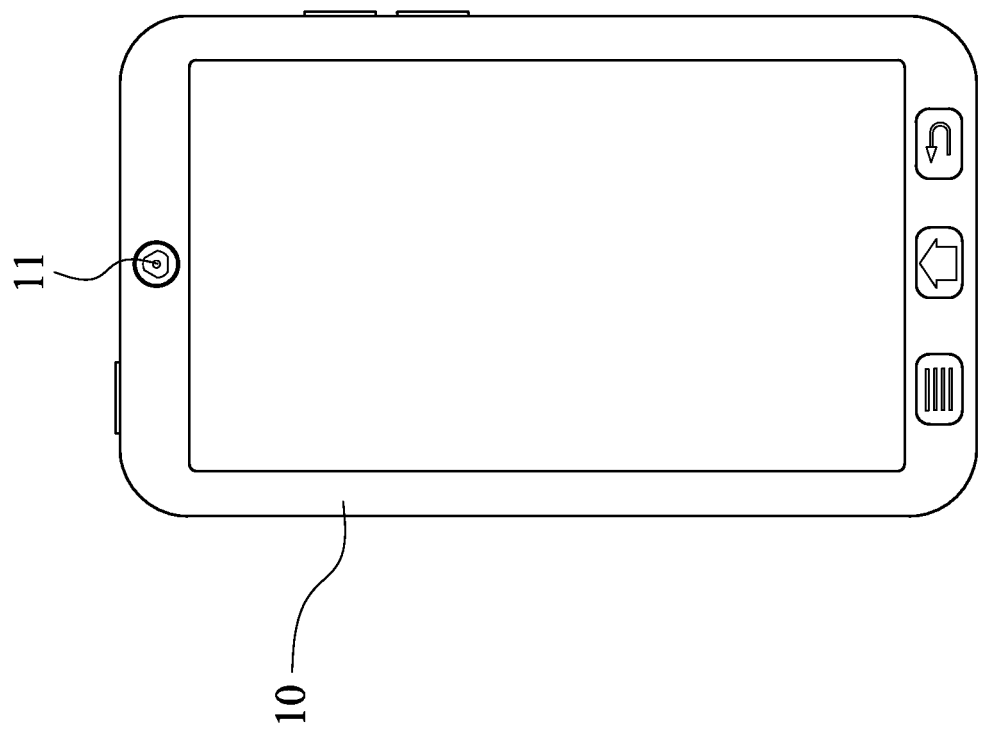
FIG. 21 shows an electronic device according to the 11th embodiment of the present disclosure.

FIG. 21 is a schematic view of an electronic device 10 according to the 11th embodiment of the present disclosure. The electronic device 10 of the 11th embodiment is a smart phone, wherein the electronic device 10 includes an image capturing apparatus 11. The image capturing apparatus 11 includes an imaging system (its reference numeral is omitted) according to the present disclosure and an image sensor (its reference numeral is omitted), wherein the image sensor is disposed on an image surface of the imaging system.

12th Embodiment

Figure 22:
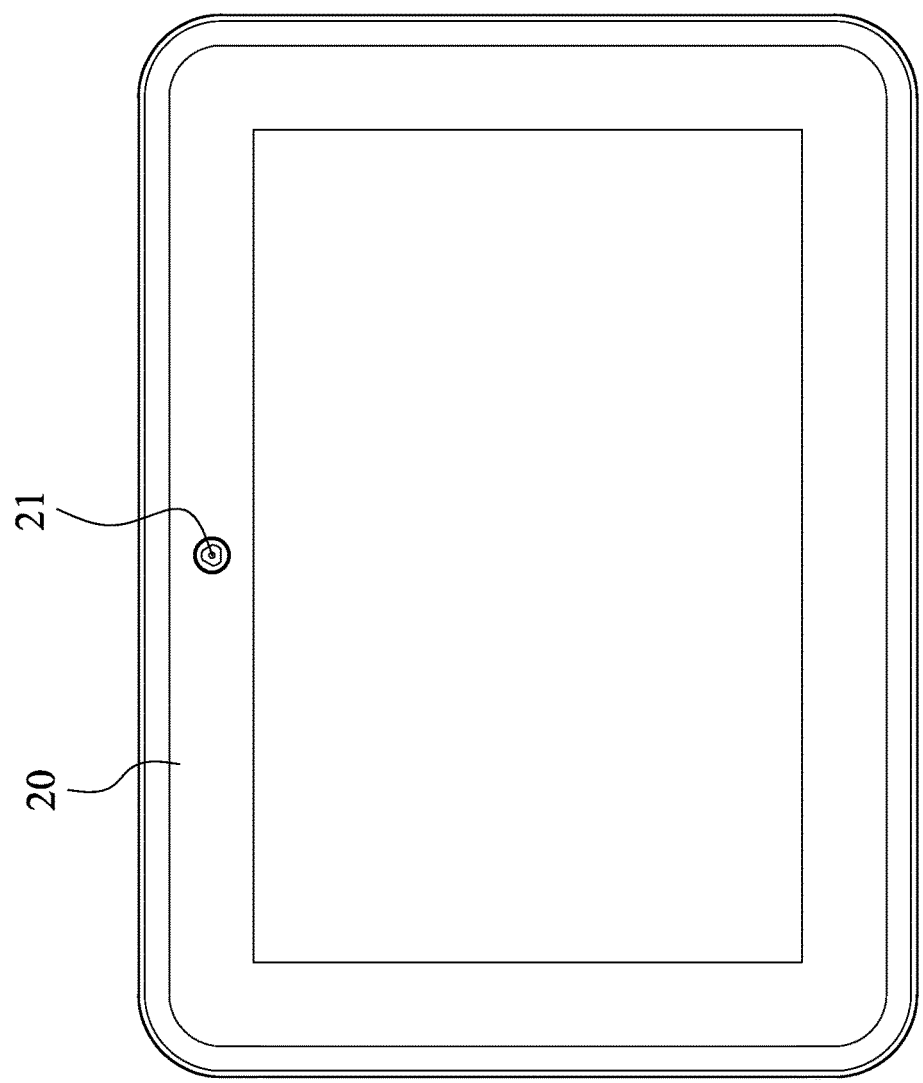
FIG. 22 shows an electronic device according to the 12th embodiment of the present disclosure.

FIG. 22 is a schematic view of an electronic device 20 according to the 12th embodiment of the present disclosure. The electronic device 20 of the 12th embodiment is a tablet personal computer, wherein the electronic device 20 includes an image capturing apparatus 21. The image capturing apparatus 21 includes an imaging system (its reference numeral is omitted) according to the present disclosure and an image sensor (its reference numeral is omitted), wherein the image sensor is disposed on an image surface of the imaging system.

13th Embodiment

Figure 23:
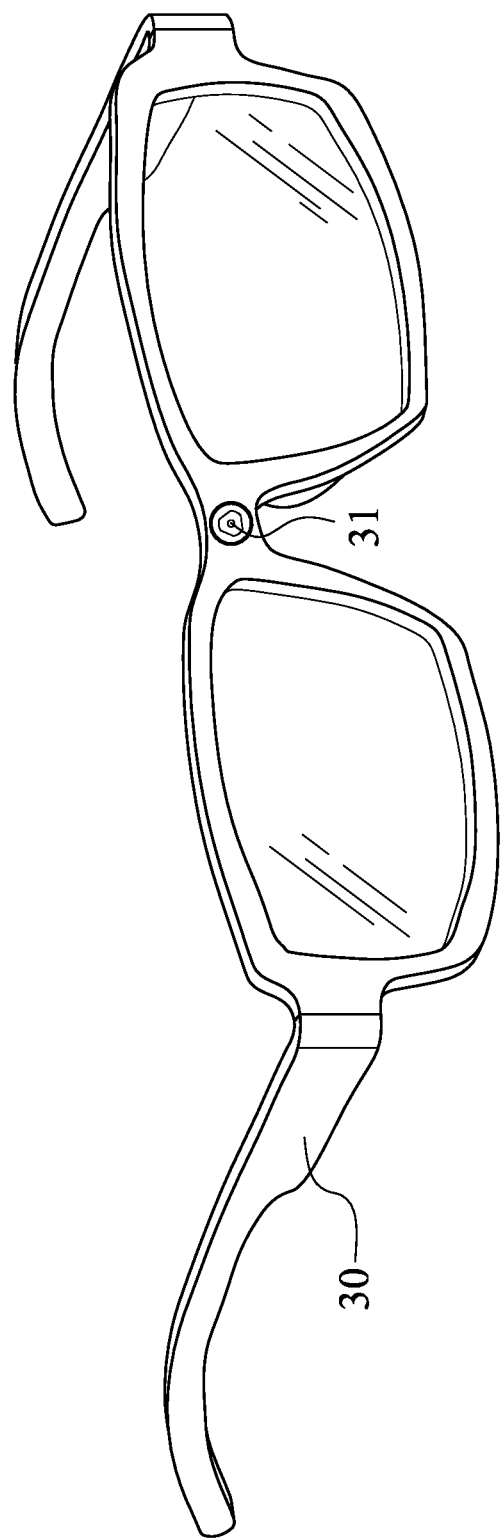
FIG. 23 shows an electronic device according to the 13th embodiment of the present disclosure.

FIG. 23 is a schematic view of an electronic device 30 according to the 13th embodiment of the present disclosure. The electronic device 30 of the 13th embodiment is a head-mounted display, wherein the electronic device 30 includes an image capturing apparatus 31. The image capturing apparatus 31 includes an imaging system (its reference numeral is omitted) according to the present disclosure and an image sensor (its reference numeral is omitted), wherein the image sensor is disposed on an image surface of the imaging system.

The foregoing description, for purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging system comprising, in order from an object side to an image side:
   a first lens element with positive refractive power having an object-side surface being convex in a paraxial region thereof;
   a second lens element with negative refractive power having an image-side surface being concave in a paraxial region thereof;
   a third lens element;
   a fourth lens element having an image-side surface being concave in a paraxial region thereof, wherein an object-side surface and the image-side surface of the fourth lens element are aspheric, and the image-side surface of the fourth lens element comprises at least one convex shape in an off-axis region thereof; and
   a fifth lens element having an object-side surface being convex in a paraxial region thereof and an image-side surface being concave in a paraxial region thereof, wherein the object-side surface and the image-side surface of the fifth lens element are aspheric, and the image-side surface of the fifth lens element comprises at least one convex shape in an off-axis region thereof;
   wherein the imaging system has a total of five lens elements, there is an air gap between every two of the first lens element, the second lens element, the third lens element, the fourth lens element and the fifth lens element that are adjacent to each other, a central thickness of the fourth lens element is CT4, an axial distance between the third lens element and the fourth lens element is T34, an axial distance between the fourth lens element and the fifth lens element is T45, a focal length of the imaging system is f, a curvature radius of an object-side surface of the third lens element is R5, a curvature radius of an image-side surface of the third lens element is R6, an Abbe number of the second lens element is V2, an Abbe number of the third lens element is V3, an Abbe number of the fourth lens element is V4, and the following conditions are satisfied:

$CT4/T34<1.20;$ $CT4/T45<1.60;$ $|f/R5|+|f/R6|<1.10;$ and $1.75<(V2+V4)/V3.$

2. The imaging system of claim 1, wherein the object-side surface of the fourth lens element is convex in a paraxial region thereof.

3. The imaging system of claim 2, wherein the Abbe number of the third lens element is V3, and the following condition is satisfied:

$V3<30.$

4. The imaging system of claim 2, wherein the central thickness of the fourth lens element is CT4, the axial distance between the third lens element and the fourth lens element is T34, and the following condition is satisfied:

$CT4/T34<1.0.$

5. The imaging system of claim 1, wherein the central thickness of the fourth lens element is CT4, the axial distance between the fourth lens element and the fifth lens element is T45, and the following condition is satisfied:

$CT4/T45<1.48.$

6. The imaging system of claim 1, wherein the central thickness of the fourth lens element is CT4, the axial distance between the fourth lens element and the fifth lens element is T45, and the following condition is satisfied:

$CT4/T45<1.25.$

7. The imaging system of claim 1, wherein the third lens element has positive refractive power.

8. The imaging system of claim 1, wherein the first lens element has an image-side surface being concave in a paraxial region thereof.

9. The imaging system of claim 1, wherein a curvature radius of the object-side surface of the fourth lens element is R7, the focal length of the imaging system is f, and the following condition is satisfied:

$|R7/f|<3.0.$

10. The imaging system of claim 9, wherein an f-number of the imaging system is Fno, an axial distance between the object-side surface of the first lens element and an image surface is TL, a half of a maximal field of view of the imaging system is HFOV, and the following conditions are satisfied:

$1.6<Fno<2.4;$ $TL<6$ mm; and $35\text{ degrees}<HFOV.$

11. The imaging system of claim 1, wherein a curvature radius of the object-side surface of the fourth lens element is R7, the focal length of the imaging system is f, and the following condition is satisfied:

$|R7/f|<2.3.$

12. The imaging system of claim 1, wherein the focal length of the imaging system is f, a focal length of the third lens element is f3, a focal length of the fourth lens element is f4, a focal length of the fifth lens element is f5, and the following condition is satisfied:

$|f/f3|+|f/f4|+|f/f5|<0.60.$

13. The imaging system of claim 1, wherein a focal length of the first lens element is f1, a focal length of the second lens element is f2, a focal length of the third lens element is f3, a focal length of the fourth lens element is f4, a focal length of the fifth lens element is f5, and the following conditions are satisfied:

$|f3|>|f1|;$ $|f3|>|f2|;$ $|f3|>|f4|;$ and $|f3|>|f5|.$

14. The imaging system of claim 1, wherein a curvature radius of the object-side surface of the fourth lens element is R7, a curvature radius of the image-side surface of the fourth lens element is R8, a curvature radius of the object-side surface of the fifth lens element is R9, a curvature radius of the image-side surface of the fifth lens element is R10, the focal length of the imaging system is f, and the following condition is satisfied:

$(|R7|+|R8|+|R9|+|R10|)/f<3.5.$

15. The imaging system of claim 1, wherein the axial distance between the third lens element and the fourth lens element is T34, the axial distance between the fourth lens element and the fifth lens element is T45, a sum of axial distances between any two of the first lens element, the second lens element, the third lens element, the fourth lens element and the fifth lens element that are adjacent to each other is ΣAT, and the following condition is satisfied:

$0.60<(T34+T45)/\Sigma AT<0.80.$

16. The imaging system of claim 1, wherein the Abbe number of the second lens element is V2, the Abbe number of the third lens element is V3, the Abbe number of the fourth lens element is V4, and the following condition is satisfied:

$V2+V3+V4<90.$

17. The imaging system of claim 1, wherein a central thickness of the first lens element is CT1, a central thickness of the second lens element is CT2, a central thickness of the third lens element is CT3, the central thickness of the fourth lens element is CT4, a central thickness of the fifth lens element is CT5, and CT5 is larger than CT1, CT2, CT3, and CT4.

18. The imaging system of claim 1, wherein a central thickness of the second lens element is CT2, a central thickness of the third lens element is CT3, the central thickness of the fourth lens element is CT4, a central thickness of the fifth lens element is CT5, and the following condition is satisfied:

$(CT2+CT3+CT4)/CT5<1.25.$

19. The imaging system of claim 1, wherein a curvature radius of the image-side surface of the fourth lens element is R8, a curvature radius of the object-side surface of the fifth lens element is R9, and the following condition is satisfied:

$1.20<R8/R9.$

20. The imaging system of claim 1, wherein the focal length of the imaging system is f, the curvature radius of the object-side surface of the third lens element is R5, the curvature radius of the image-side surface of the third lens element is R6, and the following condition is satisfied:

$|f/R5| \pm |f/R6| < 0.75$.

21. An image capturing apparatus, comprising:
the imaging system of claim 1; and
an image sensor, wherein the image sensor is disposed on an image surface of the imaging system.

22. An electronic device, comprising:
the image capturing apparatus of claim 21.

* * * * *

UNITED STATES PATENT AND TRADEMARK OFFICE
CERTIFICATE OF CORRECTION

PATENT NO. : 9,874,720 B2  
APPLICATION NO. : 14/727302  
DATED : January 23, 2018  
INVENTOR(S) : Hsueh et al.

Page 1 of 1

It is certified that error appears in the above-identified patent and that said Letters Patent is hereby corrected as shown below:

In Claim 20 (Column 43, Line 6), please delete "$|f/R5|\pm|f/R6|<0.75$" and insert therefor:
-- $|f/R5|+|f/R6|<0.75$ --

Signed and Sealed this  
Seventeenth Day of April, 2018

Andrei Iancu  
*Director of the United States Patent and Trademark Office*